United States Patent [19]

Snodgrass et al.

[11] Patent Number: 5,841,770
[45] Date of Patent: Nov. 24, 1998

[54] DATA COMMUNICATION SYSTEM USING INDENTIFICATION PROTOCOL

[75] Inventors: Charles K. Snodgrass, Boise, Id.; David H. Allen, Rochester, Minn.; John R. Tuttle, Boise, Id.; Robert R. Rotzoll, Boise, Id.; George E. Pax, Boise, Id.

[73] Assignee: Micron Technology, Inc., Boise, Id.

[21] Appl. No.: 726,560

[22] Filed: Oct. 7, 1996

Related U.S. Application Data

[63] Continuation of Ser. No. 263,210, Jun. 21, 1994, Pat. No. 5,583,850, which is a continuation of Ser. No. 990,918, Dec. 15, 1992, Pat. No. 5,365,551.

[51] Int. Cl.$^6$ .................................................. H04L 1/00
[52] U.S. Cl. ...................... 370/346; 370/449; 340/825.08
[58] Field of Search ................................... 370/347, 346, 370/447, 312, 349, 449; 340/825.07, 825.08; 455/49.1, 53.1, 54.1, 55.1, 500, 70

[56] References Cited

U.S. PATENT DOCUMENTS

| | | | |
|---|---|---|---|
| 4,799,059 | 1/1989 | Grindahl et al. | 340/825.54 |
| 4,845,504 | 7/1989 | Roberts | 342/457 |
| 4,955,018 | 9/1990 | Twitty et al. | 370/395 |
| 4,969,146 | 11/1990 | Twitty et al. | 370/338 |
| 5,019,813 | 5/1991 | Kip et al. | 340/825.54 |
| 5,025,486 | 6/1991 | Klughart | 455/38.1 |
| 5,046,066 | 9/1991 | Messenger | 370/349 |
| 5,124,697 | 6/1992 | Moore | 340/825.53 X |
| 5,144,313 | 9/1992 | Kirknes | 342/42 X |
| 5,144,668 | 9/1992 | Malek et al. | 380/48 |
| 5,150,310 | 9/1992 | Greenspun | 342/451 |
| 5,164,985 | 11/1992 | Nysen et al. | 375/204 |
| 5,168,510 | 12/1992 | Hill | 375/267 |
| 5,194,860 | 3/1993 | Jones et al. | 340/870.02 |
| 5,231,646 | 7/1993 | Heath et al. | 375/200 |
| 5,307,463 | 4/1994 | Hyatt et al. | 395/821 |
| 5,365,551 | 11/1994 | Snodgrass et al. | 375/1 |
| 5,500,650 | 3/1996 | Snodgrass et al. | 342/42 |
| 5,583,850 | 12/1996 | Snodgrass et al. | 370/342 |

OTHER PUBLICATIONS

Wolf, Jack K.; "Principles of Group Testing and an Application to the Design and Analysis of Multi–Access Protocols"; NATO ASI Series E: Applied Sciences; 1983; pp. 237–257; pub. Martinus Nijhoff.

Humblet & Mosely; "Efficient Accessing of a Multi–Access Channel"; Proc. IEEE Conf. Decis. Control. Incl. Symp. Adapt. Processes 19th, v. 1; 1990; pp. 624–627.

Capetanakis, John.; "Tree Algorithms for Packet Broadcast Channels"; IEEE Trans. Info. Theory, vol. IT–25, No. 5; Sep. 1979; pp. 505–515.

Capetanakis, John I.; "Generalized TDMA: The Multi–Accessing Tree Protocol"; IEEE Trans. Comm., vol. COM–27, No. 10; Oct. 1979; pp. 1476–1483.

*Primary Examiner*—Benedict V. Safourek
*Assistant Examiner*—Seema S. Rao
*Attorney, Agent, or Firm*—William R. Bachand; Robert J. Stern

[57] ABSTRACT

One or more interrogating commander stations and an unknown plurality of responding responder stations coordinate use of a common communication medium. Each commander station and each responder station is equipped to broadcast messages and to check for error in received messages. When more than one station attempts to broadcast simultaneously, an erroneous message is received and communication is interrupted. To establish uninterrupted communication, a commander station broadcasts a command causing each responder station of a potentially large first number of responder stations to each select a random number from a known range and retain it as its arbitration number. After receipt of such a command, each addressed responder station transmits a response message containing its arbitration number. Zero, one, or several responses may occur simultaneously. By broadcasting requests for identification to various subsets of the full range of arbitration numbers and checking for an immediate error-free response, a commander station can determine the arbitration number of every responder station capable of communicating at the time. Consequently, a commander station can conduct subsequent uninterrupted communication with each responder station, for example by addressing only one responder station. Responder stations of this invention -require minimal logic and circuitry to respond to multiple commander stations.

25 Claims, 10 Drawing Sheets

140 — | PREAMBLE | COMMAND | POSTAMBLE |

FIG. 4

| COMMANDS | | | |
|---|---|---|---|
| OPCODE (HEXA-DECIMAL) | MNE-MONIC | DESCRIPTION | FORMAT |
| 08 | ID | IDENTIFY | 142 |
| A9 | IDG | IDENTIFY AND GENERATE ARBITRATION NUMBER | 142 |
| EA | IDC | IDENTIFY AND CLEAR LOCKED BIT 88 | 142 |
| 4B | IDCG | IDENTIFY, CLEAR LOCKED BIT 88, AND GENERATE ARBITRATION NUMBER | 142 |
| 8E | RD | READ DATA AND SET LOCKED BIT 88 | 144 |
| 2F | WD | WRITE DATA AND SET LOCKED BIT 88 | 146 |

FIG. 5

142 — | OPCODE | MASK | BRANCH | LOCAL ID |

144 — | OPCODE | ARBITRATION NUMBER | LOCAL ID |

146 — | OPCODE | ARBITRATION NUMBER | LOCAL ID | TAG | DATA |

FIG. 6

190
| PREAMBLE | RESPONSE | POSTAMBLE |

FIG. 7

| RESPONSES |||
|---|---|---|
| MNE-MONIC | DESCRIPTION | FORMAT |
| IDR | RESPONSE TO ID, IDG, IDC, AND IDCG COMMANDS | 192 |
| RDR | RESPONSE TO RD COMMAND | 194 |
| WDR | RESPONSE TO WR COMMAND | 196 |

FIG. 8

192
| REVISION | LOCAL ID | ARBITRATION NUMBER | INVERTED ARBITRATION NUMBER |

194
| ARBITRATION NUMBER | LOCAL ID | TAG | DATA |

196
| ARBITRATION NUMBER | LOCAL ID | STATUS |

FIG. 9

DATA COMMUNICATION SYSTEM USING INDENTIFICATION PROTOCOL

This application is a continuation of application Ser. No. 08/263,210 filed Jun. 21, 1994, now U.S. Pat. No. 5,583,850, which is a continuation of application Ser. No. 07/990,918 filed Dec. 15, 1992, now U.S. Pat. No. 5,365,551.

RELATED APPLICATIONS

The following commonly assigned copending U.S. applications refer to subject matter related to the subject matter of this application: "Radio Frequency Identification Device (RFID) and Method of Manufacture, Including an Electrical Operating System and Method," filed Jul. 7, 1992, U.S. Ser. No. 07/899,777, now abandoned; "Electrically Powered Postage Stamp or Mailing or Shipping Label Operative with Radio Frequency (RF) Communication," filed Aug. 11, 1992, U.S. Ser. No. 07/928,899, now abandoned; and "Data Communication System Using Identification Protocol," filed Dec. 15, 1992, now U.S. Pat. No. 5,500650.

BACKGROUND OF THE INVENTION

This invention relates generally to the field of digital computer data communication. The invention relates more specifically to the data link layer and medium access control of a packet message protocol used in a medium such as radio communication or the like where the quantity and capability of stations requiring use of the medium at a given time cannot be predetermined.

As one example of a communication system, consider a system for handling baggage in an airport terminal. Such a system incorporates radio frequency identification (RFID) between interrogators and responders. In such a system, each baggage tag is a responder station. A station in this sense does not imply stationary location but indicates a device that includes a transceiver for communication. As each bag is transported from its origin to its destination, it sequentially enters areas where interrogation and control functions are to be accomplished by one or more interrogators on all baggage tags in the area within a short period of time. In such an application, as well as in applications where inventory, personnel, animals, packages, samples, mobile stations, and objects must be identified and tracked, there remains a need for communication apparatus and protocol having minimal complexity in circuitry, firmware, and software so that stations can be conveniently equipped and used at practical cost. Whether a communication system is practical depends largely on the system designer's choice of a communication protocol.

A protocol is a method employed uniformly by stations using a common communication medium. Using one method, each station can uniformly determine when it may and when it should not attempt transmission on the medium. By following one protocol, efficient communication can be realized; that is to say that each station's objective for communicating can be accomplished with the least delay and the fewest and shortest messages. Communication efficiency could also be defined as the percentage of time during which only one station is transmitting on the medium. Hence, periods when no station is transmitting and periods when more than one station is transmitting are to be avoided. In the latter case, a collision is said to occur and no intelligible message can be received. The central purpose of a protocol is to provide means for arbitrating between stations that would otherwise cause a collision.

Sophisticated protocols achieve high communication efficiency at the expense of circuit and software complexity required at each station using the protocol. The objectives achieved by communication vary with system design and, for example, may include information transfer, remote sensing and control, and shared computational or shared peripheral capability. These objectives are realized by central control of communication or by distributed control. In a system having central access control, permission to use the medium is granted by a central station. When control is distributed, the stations collectively perform a medium access control function to dynamically determine the order in which stations transmit. Of course, interstation communication via the common medium cannot be used to arbitrate. Therefore, the typical protocol includes a set of rules and conditions that each station is constrained in advance to follow. Due to the large number of stations in the modern communication system, random numbers are often employed in arbitration schemes.

Data communication systems have grown in complexity from two-party connections common in the 1970s to systems in the 1990s that interconnect, for example, all employees in a company, all university libraries in a worldwide network, and hundreds of independently managed global networks into a matrix of networks. Such networks are described in "The Matrix, Computer Networks and Conferencing Systems Worldwide" by John S. Quarterman, published by Digital Press, Bedford Mass. (1990), incorporated in full herein by reference. The rapid increase in the number of stations on these networks has been made possible by the adoption of standard protocols. The majority of these standards use distributed access control so that a network can be formed without agreement to a centralized authority. Network standards and access control are further described in "Handbook of Computer-Communications Standards Volume 2 Local Network Standards," by William Stallings, Ph.D., published by Howard W. Sams & Co., Indianapolis, Ind. (1988), incorporated in full herein by reference. After widespread adoption of a standard distributed control protocol, changes to the protocol are costly to implement and, therefore, infrequent. Such change ordinarily would require equipment, firmware, or software changes at each station, and coordination to avoid disruption of important communication. Hence, compatibility with existing networks has led communication systems design away from the development of new protocols, especially new protocols having centralized media access control.

There are many commercial digital communication systems using message packets. Radio communication using message packets are also known. Initial amateur radio packet communication employed a simple acknowledge protocol yielding less than 20% communication efficiency. Improved efficiency was later obtained by adopting a standard distributed medium access control protocol. The description by Quarterman and Stallings of radio networks including the ALOHA network, the Packet Radio Network (PRNET), and the Amateur Radio Packet Radio Network (AMPRNET) is included herein by reference.

Existing popular protocols place a heavy burden of software and circuit complexity upon each station. This burden is illustrated in several standard communication protocols that have been developed for networks of physically connected stations. One ring architecture protocol requires each station to monitor its input channel and retransmit on its output channel the incoming message followed by the station's own message, if any. Another protocol requires each station to transmit only within a time slot beginning at a predetermined time after the station receives a header message broadcast on the medium. A third protocol, commercially known as ethernet, requires each station to perform the following steps:

1. Monitor the medium for inactivity.
2. Generate a random number.
3. Wait a time period based in part on the random number.
4. Attempt to transmit.
5. Detect if a portion of its transmission occurred while another station was transmitting and if so.
6. Begin a subsequent attempt to use the medium by monitoring for inactivity.

Such a method adds to the functional complexity of each station.

In systems having no physical connection between stations, i.e. all stations can receive a broadcast simultaneously, there is a need for a protocol independent of a sequential relationship between stations as in a ring architecture. In systems supporting many thousands of potential stations, time slot assignments are impractical.

Suppose an application requires one station to quickly determine whether all stations currently able to use the medium have been interrogated or commanded in order to accomplish a particular objective through communication. In such an application, ethernet would be unsatisfactory because such a determination depends upon the sum of an indeterminate number of time intervals having randomly selected durations.

Thus, there remains a need for a communication system suited for coordinating the use of a common medium among potentially thousands of stations where no physical connection between stations is desirable and interrogation or control activities must be accomplished in limited time. In addition, there remains a need in some applications to minimize the circuit, firmware, and software complexity required at some stations, perhaps at the expense of complexity at other stations. Without decreasing the complexity, the size and cost per station cannot be reduced to permit new and improved communication systems that employ inexpensive disposable stations such as baggage tags, inventory labels, and the like.

SUMMARY OF THE INVENTION

A communication system, according to the present invention, employs a common communication medium used by one or more interrogating commander stations and a plurality of responding responder stations. The communication system implements a communication protocol that permits responder stations to be functionally less complex than commander stations. A commander station performs more monitoring and decision making functions than a responder station. Both commander and responder stations generate packets that may contain messages, commands, responses, numbers, coded digital words, and error detection codes. When more than one station transmits on the common medium simultaneously, the resulting interfering transmissions can be detected as an improper transmission at a receiving station, for example, by digital error detection.

According to the present invention, a responder station responds after receiving an error-free message that includes means for the responder station to determine that it has been addressed. When not addressed, the responder station does not respond. A responder station can be addressed individually by including its unique identification number in the message or as a member of a group by including a group designation in the message. Uninterrupted communication between a commander station and a responder station can be conducted in one of two ways. First, when the message transmitted from a commander station includes a group designation to which only one responder station is a member, only one responder station responds. Second, when the message transmitted from a commander station includes the unique identification of one responder station, only one responder station responds. When the unique identification of responder stations cannot be predetermined, communication, according to one embodiment of the present invention, proceeds as follows.

To establish uninterrupted communication between a commander station and a responder station, the commander station generates and broadcasts a packet containing a command for a first group of responder stations to generate and retain a random number called an arbitration number. When a transmission is intended to be acted upon by a group of receiving stations, the transmission is a type of broadcast called a multicast. Responder stations within the first group are to respond soon after the multicast each giving its arbitration number in a packet containing means for error detection.

After a commander station transmission, several, one, or zero responder stations may simultaneously respond. Following the commander station transmission, when no response is received within a predetermined time, the commander station can ascertain that no responder stations that are members of the first group are currently coupled to the common medium. If an error-free response is received by the commander station, subsequent communication with the responding station can be conducted without interruption when the commander station addresses the responder station as previously discussed. If no message is received within a predetermined time or if a message is received in error (probably caused by several simultaneous responses), the commander station selects a second group and commands the second group to respond.

By broadcasting requests for identification to subsets of the full range of arbitration numbers and checking for a timely error-free response, a commander station can determine the arbitration number of every responder station currently coupled to the common medium.

By requiring initiation of communication by a commander station and substantially immediate response by a responder station, communication systems of the present invention have fewer functional requirements to meet at each responder station. For example, according to the present invention, the responder station is not required to monitor the medium for an opportunity to transmit, monitor the effectiveness of its responses, retransmit responses, or detect retransmitted packets.

According to one aspect, a commander station can establish communication with more than one responder station independent of the operation of other commander stations.

According to another aspect of the present invention, a responder station can sequentially communicate with more than one commander station. Communication systems having multiple commander stations and multiple responder stations are desirable.

According to yet another aspect, a commander station can quickly establish communication with a plurality of responder stations soon after responder stations become coupled to the medium common to that commander station.

According to still another aspect, a responder station can become uncoupled from the medium common to a first group of commander stations and later can be coupled to the medium common to a second group of commander stations without adversely affecting existing or future communication between commander stations and other responder stations.

These and other applications, features, benefits, aspects, and results of the present invention are described below with reference to the accompanying drawings.

DESCRIPTION OF THE DRAWINGS

FIG. 4 is a diagram of the packet format broadcast by a commander station.

FIG. 5 is a table that describes command opcodes and refers to command formats described in FIG. 6.

FIG. 6 is a diagram of command formats.

FIG. 7 is a diagram of the packet format broadcast by a responder station.

FIG. 8 is a table that describes response mnemonics and refers to response formats described in FIG. 9.

FIG. 9 is a diagram of response formats.

DETAILED DESCRIPTION OF THE INVENTION

Figure 1:
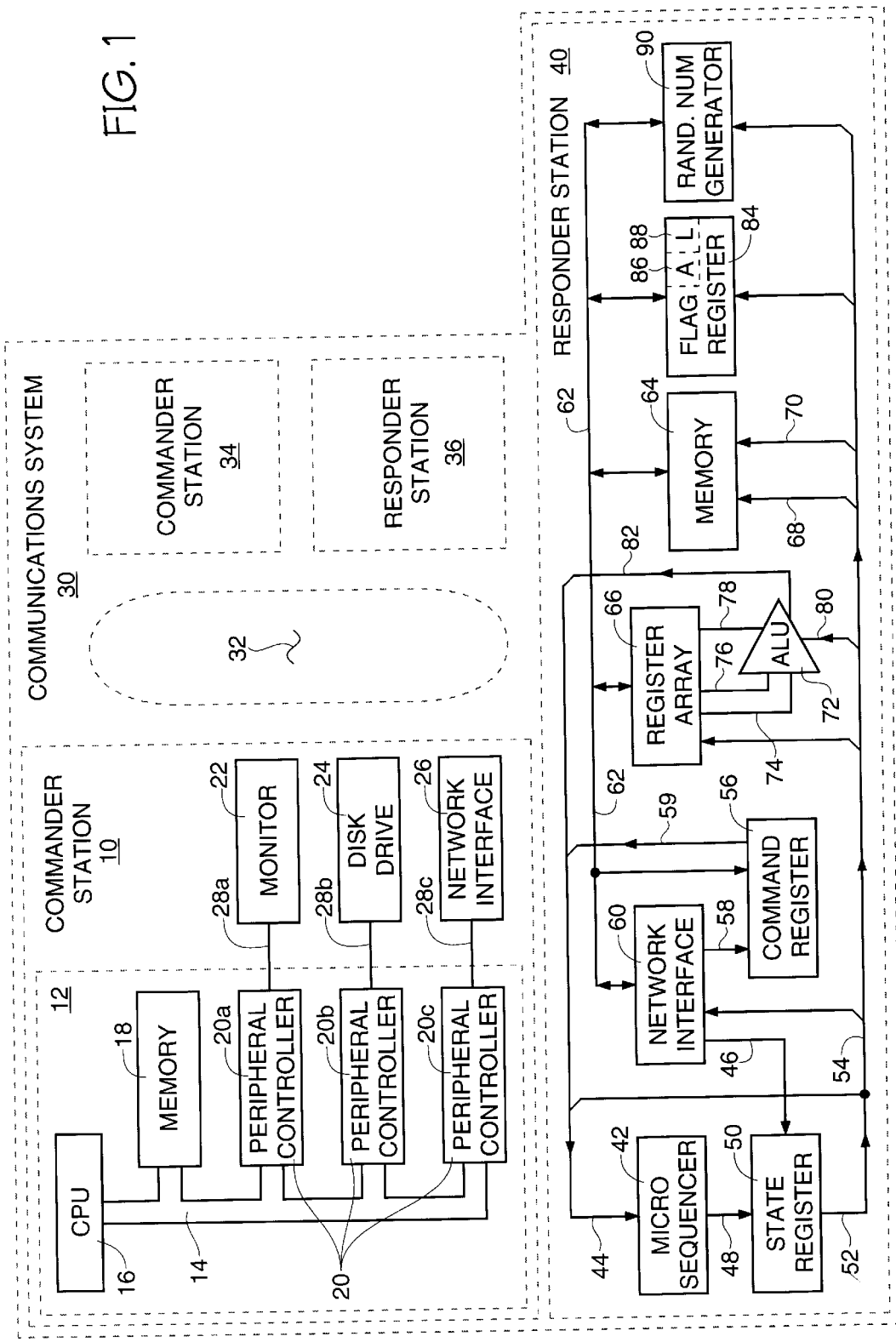
FIG. 1 is a functional block diagram of a communication system of the present invention.

FIG. 1 is a functional block diagram of communication system 30 of the present invention. In FIG. 1, commander stations 10 and 34 and responder stations 40 and 36 are coupled to common medium 32 by network interfaces 26 and 60, respectively. In practice, a plurality of commander and responder stations would be distributed geographically. The type of medium selected for communication depends on the communication system application; see below for equivalent variations. The embodiment depicted in FIG. 1 illustrates the invention in an application such as airport baggage handling. For this embodiment, the medium is free space through which radio frequency communication are transmissible.

Commander station 10 is designed to achieve a flexible system architecture while incorporating many commercially available components. Commander station 10 includes personal computer system 12 having data and control bus 14 shared by central processor 16, memory 18, and peripheral controllers 20a and 20c. Monitor 22, disk drive 24, and network interface 26 connect to individual peripheral controllers 20a–20c via connecting signals 28a–28c, respectively. Network interface 26 is coupled to common medium 32. Network interface 26 could be implemented in a chassis separate from the chassis of personal computer system 12 or equivalently could be implemented in combination with the functions of the network interface peripheral controller 20c for connection directly to data and control bus 14.

The configuration of commander station 10 illustrates several advantages. Communication system configuration and operation are largely dictated by software loaded via disk drive 24, stored in memory 18, and performed by central processor 16. Disk drive 24, memory 18, central processor 16, as well as monitor 22 and peripheral controllers 20a–20c are all conventional, general purpose, and readily available apparatus. Therefore, additional functions and changes to communication system 30 can be made in software with little or no mechanical changes to commander station 10. The operation of commander station software will be discussed below.

Responder station 40 is designed for minimal circuitry to achieve, among other things, small size and low power consumption. Small size permits convenient use, for example, as a baggage tag. Low power consumption permits further size reduction and reduces manufacturing and operating costs. Small size and low manufacturing costs combine to permit implementing responder station 40 as a convenient, dispensable, throw-away item such as a baggage tag, package label, or the like.

In essence, microsequencer 42 forms the core of responder station 40. Microsequencer 42 is a read only memory that produces data signal 48 in response to address signal 44. In operation, a value is presented as address signal 44 once every period of clock signal 46. Data signal 48 from microsequencer 42 is stored in state register 50 once every period of clock signal 46. The output of state register 50 is state signal 52, which forms control bus 54. Control bus 54 causes register transfer operations to be described below. A portion of state signal 52 defines a portion of address signal 44. Thus, a sequence of state transitions occurs in synchronism with clock signal 46 as defined by the internal operation of microsequencer 42 and other signals together comprising address signal 44, as will be described below. A state transition diagram is also discussed below. In the typical microsequencer, internal multiplexers reduce the range of read only memory addresses that would otherwise be required. Microsequencer 42 is of a class of devices described by Charles Belove in "Handbook of Modern Electronics and Electrical Engineering," pp 2135–2142, published by John Wiley & Sons, New York, N.Y. (1986), incorporated herein by reference; and by Y. Chu in "Computer Organization and Microprogramming," published by Prentice-Hall, Englewood Cliffs, N.J. (1972) incorporated in full herein by reference.

Network interface 60 of responder station 40 is coupled to common medium 32 in a way similar to the coupling of network interface 26 of commander station 10 to common medium 32. Network interface 60 connects to state register 50 to supply clock signal 46. Network interface 60 connects to control bus 54 so that send and receive operations are directed in part by state signal 52. When microsequencer 42 is in an appropriate state, data received by network interface 60 is transferred from network interface 60 to command register 56 by data bus 62 in conjunction with load signal 58. Command register output 59 defines a portion of address signal 44. Network interface 60 also connects via data bus 62 to memory 64, register array 66, flag register 84, and random number generator 90 for transfer of data between these function blocks, for storage of received data, and for recall of data to be sent.

In one embodiment, data bus 62 is byte-wide. Network interface 60 converts received data from serial to byte-parallel organization. The several devices that connect to data bus 62 make a byte-parallel connection.

In another embodiment, data bus 62 is bit-serial. Control bus 54, in such an embodiment, includes serial clock signal (not shown). Register transfer among network interface 60, register array 66, memory 64, flag register 84, and random number generator 90 are accomplished in bit-serial fashion with appropriate electrical interfaces known in the art.

In yet another embodiment, a combination of serial and parallel data paths are implemented. The system designer's choices of serial or parallel as well as the number of bits per register transfer operation, depends on factors including system and device timing limitations, noise immunity, power dissipation, device size, topology, and layout constraints.

Memory 64 connects to read/write signal 68 and memory address signal 70 which are part of control bus 54. Memory 64 is used to store values for responder station identification and data related to the communication system application. For example, when a responder station is used as an airline baggage tag, postal mailing label, or inventory control tag, memory 64 would store data describing a destination for the item to which the tag is attached.

Register array 66 performs functions similar to a multi-port memory. Register array 66 connects to arithmetic-logic unit (ALU) 72 for the presentation of operand signals 74 and 76, and storage of result signal 78. Operand and result signals are multi-bit digital signals for arithmetic operations such as addition, bit-wise parallel logical operations such as logical-AND, and bit-wise serial operations such as shift-left. Register array 66 connects to control bus 54 so that registers to be coupled to operand and result signals are selected and stored according to state signal 52.

In addition to the connections already described, a portion of control bus 54 connects to ALU 72 to supply opcode signal 80 to ALU 72. Opcode signal 80 selects one of a plurality of possible operations to be conducted by ALU 72. When an equality comparison has been selected by opcode signal 80 and operand signals 74 and 76 are bit-wise identical, A=B signal 82 is asserted by ALU 72. A=B signal 82 defines a portion of address signal 44.

Control bus 54 connects to individual bits arranged in flag register 84. Addressed-bit 86, part of flag register 84, is set under control of state signal 52 to indicate whether responder station 40 has been addressed in a received command message. Locked-bit 88, also part of flag register 84, is set under control of state signal 52 to indicate whether responder station 40 should ignore messages from a commander station because responder station 40 has already announced its identification to a commander station. The significance of addressed-bit 86 and locked-bit 88 will become more readily apparent in the description below.

Random number generator 90 connects to control bus 54 and data bus 62 for transferring a random number of a predetermined precision to register array 66. When retained in register array 66, the random number is called an ARBITRATION NUMBER whose function will be discussed below. Circuit techniques for generating a random number in digital format are well known and described, for example, by H. F. Murray in "General Approach for Generating Natural Random Variables", IEEE Transactions on Computers, Vol. C-19, No. 12, pp 1210–1213, December 1970, incorporated herein by reference. In one embodiment, random number generator 90 is similar to an integrated circuit implementation described by Alan Folmsbee, et. al., in their article, "128K EPROM with Encrypted Read Access", published in the Digest of Technical Papers IEEE International Solid-State Circuits Conference pp 46–47 and 103, by Lewis Winner, Coral Gables, Fla., 1985, incorporated herein by reference.

Figure 2:
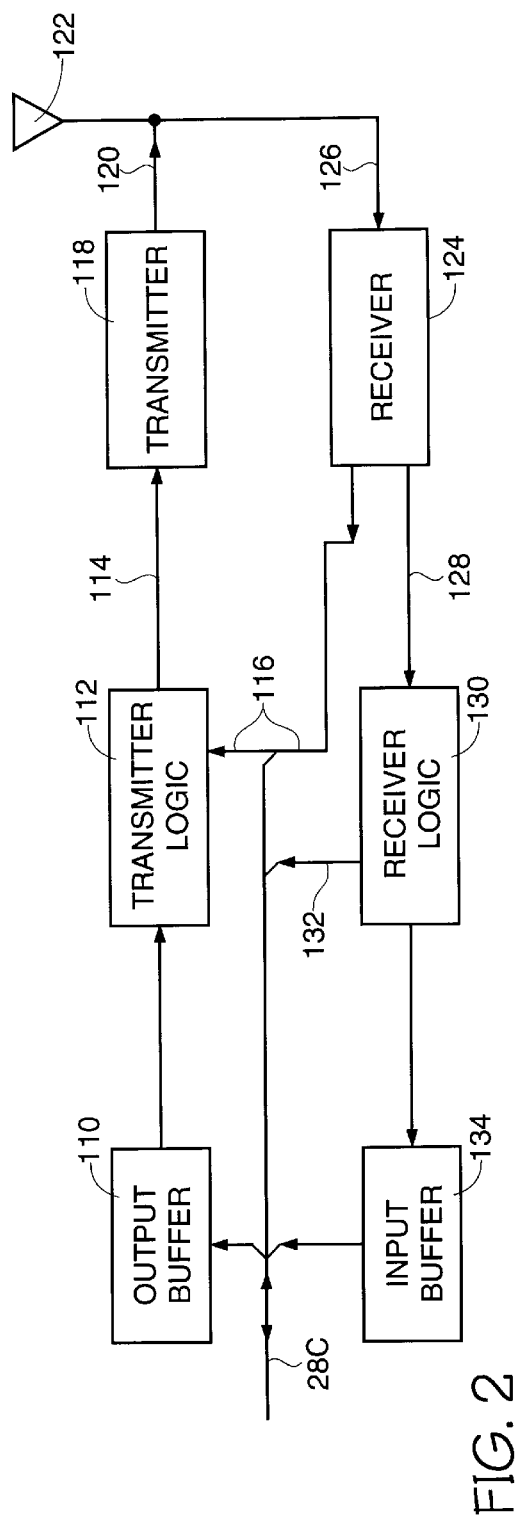
FIG. 2 is a functional block diagram of commander station network interface 26 shown in FIG. 1.

FIG. 2 is a functional block diagram of network interface 26 shown in FIG. 1. Within network interface 26, connecting signal 28c couple to output buffer 110. Byte-parallel loading of output buffer 110 is accomplished by network interface peripheral controller 20c shown in FIG. 1. Bytes are removed from output buffer 110 by transmitter logic 112 to accomplish several processing objectives. In one embodiment, a 5-bit cyclic redundancy check (CRC) code is joined to each 8-bit byte to form a 13-bit word. Redundancy, provided by the 5-bit code, facilitates error detection and limited error correction by responder station 40. Table 1 describes the format of the 13-bit word and includes a description of the CRC code used in one embodiment. Suitable CRC encoder and decoder circuits used in transmitter logic 112 and receiver logic 178 are described in detail in "Error Control Coding: Fundamentals and Applications," by Shu Lin and Daniel J. Costello Jr., Prentice-Hall Englewood Cliffs, N.J. 1983, pp 62–94. Transmitter logic 112 also generates transmit serial bit stream 114 which includes a message preamble bit stream, one or more successive 13-bit words from output buffer 110, and a postamble bit stream. When permitted by OK-to-transmit signal 116, transmit serial bit stream 114 is presented to transmitter 118. Transmitter 118 in one embodiment produces a radio frequency transmit signal 120 by modulation and couples that signal to antenna 122. Appropriate modulation methods depend on the communication medium.

TABLE 1

| Bit Order of Transmission | D7,D6, . . . D0,P4,P3, . . . P0 (P0 transmitted first) |
|---|---|
| CRC Generation Equations | P0=D1+D2+D5+D7 |
| | P1=D1+D3+D4+D6 |
| | P2=D0+D2+D3+D6+D7 |
| | P3=D0+D4+D5+D6+D7 |
| | P4=D0+D1+D2+D3+D4+D5 |

For a communication system for airport baggage handling, modulation includes, for example, spread spectrum modulation having pseudo noise characteristics. Other techniques for transmitter design appropriate to radio transmission and other media will be readily apparent to those skilled in the arts applicable to communication on a particular medium. A power level of approximately 1 watt is sufficient to excite responder station network interface 60 at distances and noise levels typically required for a communication system for airport baggage handling.

Receiver 124 is coupled to antenna 122 for amplifying and filtering radio frequency received signal 126. Receiver 124 derives OK-to-transmit signal 116 from power level measurements on received signal 126 and provides signal 116 to transmitter logic 112. Although responder station network interface 60 need not generate a transmitted signal using the same modulation technique employed in transmitter logic 112 and transmitter 118, a common method is preferred, for example, in order to minimize circuitry in responder station network interface 60. Thus, receiver 124 removes the carrier signal and other artifacts of modulation generated by responder station network interface 60 in one embodiment by synchronizing with the spread spectrum signal and removing pseudo noise characteristics through known detection and filtering methods. Resulting received serial bit stream 128 is coupled to receiver logic 130, in one embodiment, for determining whether a proper message has been received and for decomposing the message into successive 8-bit bytes. The method and circuitry required to determine whether a proper message has been received depend on the redundancy that responder station network interface 60 incorporates into received serial bit stream 128.

For a communication system for airport baggage handling, responder station 40 may transmit at a power level of 1 milliwatt or less. Multiple and more sophisticated error detection schemes transmitted from responder station 40 will extend the limit of physical separation between commander station 10 and responder station 40. Error detection schemes are well known. Such schemes may also permit reliable communication in environments having substantial noise levels. On the other hand, limits to the complexity and power consumption of responder station 40 may limit the extent of encoding circuitry therein. Where responder station network interface 60 facilitates one or more particular error detection schemes, receiver logic 128 decomposes, decodes, detects, and to a limited extent corrects errors in received serial bit stream 128. In one embodiment, receiver logic 130 determines proper-message-received signal 132 by decoding Viterbi encoding using model Q1601 decoder available from Qualcomm, Inc., San Diego, Calif. according to Qualcomm application notes and the parameters: Rate R=½, Generating Functions G0=171(octal) and G1=133 (octal), and Constraint Length K=7. Receiver logic 130 also performs serial to parallel conversion to produce successive 8-bit bytes which are stored in input buffer 134.

Network interface peripheral controller 20c, responsive to OK-to-transmit signal 116 and proper-message-received signal 132, generates signals on data and control bus 14 from which central processor 16 can determine whether a proper message has been received as of a predetermined time after transmission and if not, whether no message was received. Other control signals, known in the art and not shown, are generated and sensed to orchestrate the loading of output buffer 110 and the unloading of input buffer 134 under control of central processor 16.

Figure 3:
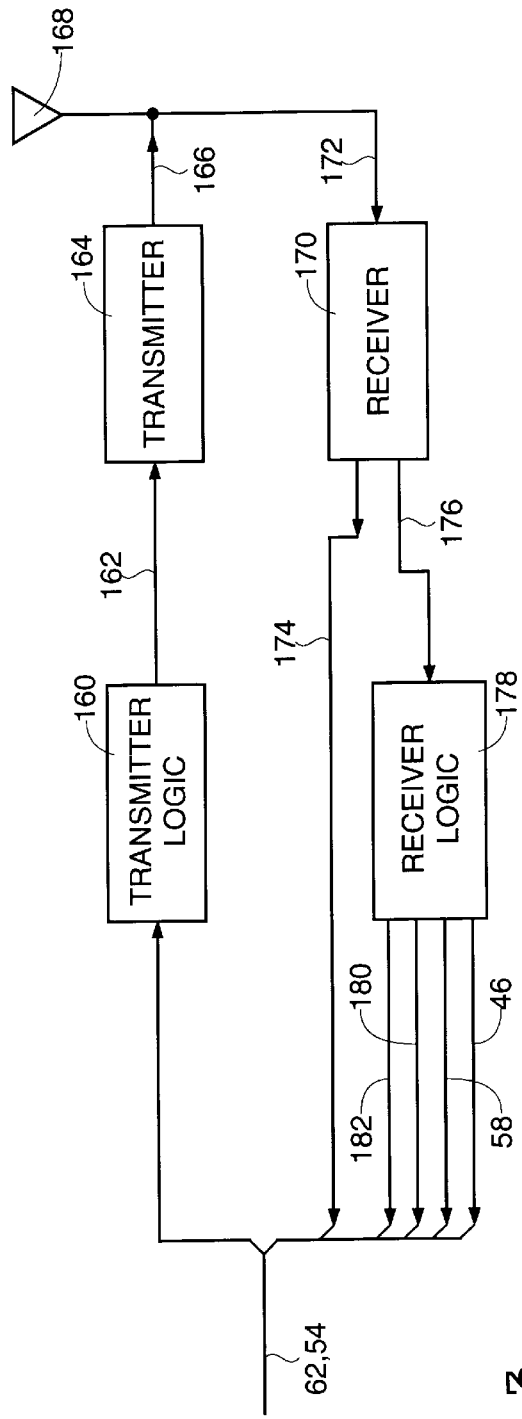
FIG. 3 is a functional block diagram of responder station network interface 60 shown in FIG. 1.

FIG. 3 is a functional block diagram of responder station network interface 60 shown in FIG. 1. The configuration illustrated in FIG. 3 performs functions similar to those already described above for commander station network interface 26. Differences between the two serve primarily to limit the complexity of responder station circuitry. Data bus 62 connects to transmitter logic 160. When directed by microsequencer 42 via signals on control bus 54, transmitter logic 160 generates a message preamble bit stream. Then, for each bit of each word read from memory 64 or register array 66, transmitter logic 160 develops a Viterbi code. Functional descriptions suitable for designing circuits or computer programs for generating Viterbi and similar convolutional codes are explained in "Error Control Coding: Fundamentals and Applications," by Shu Lin and Daniel J. Costello Jr., Prentice-Hall Englewood Cliffs, N.J. 1983, pp 287–456; and "Error-Correction Coding for Digital Communications", by George C. Clark, Jr. and J. Bibb Cain, Plenum Press, New York, N.Y. 1981, pp 227–266. Message signal 162 presents the codes to transmitter 164. Following the last code, transmitter logic 160 generates a message postamble bit stream. Transmitter 164 modulates message signal 162 in a way compatible with receiver 124 and receiver logic 130. The resulting transmit radio frequency signal 166 is coupled to antenna 168. Redundancy, provided by the Viterbi codes, facilitates error detection and limited error correction when the message is received at commander station 10.

Receiver 170 is coupled to antenna 168 for amplifying and filtering radio frequency received signal 172. Receiver 170 derives wake-up signal 174 from power-level measurements on received signal 172 and provides wake-up signal 174 to power control and restart circuits not shown. In a communication system for airport baggage handling, non-critical circuitry in responder station 60 is powered by battery only after the preamble of a packet has been detected. Receiver 170 also removes the carrier signal and other artifacts of modulation generated by commander station network interface 26 in one embodiment by synchronizing with the spread spectrum signal and removing pseudo noise characteristics through detection, demodulation, decoding, and filtering methods known in the radio communication arts. Resulting received serial bit stream 176 is coupled to receiver logic 178. In one embodiment, receiver logic 178 performs several functions: Determining whether a proper byte has been received, consequently generating improper-byte-received signal 180, and decomposing the packet into successive 8-bit bytes forming received message signal 182. The method and circuitry required to determine whether a proper byte has been received depend on the redundancy that commander station network interface 26 incorporates into transmit serial bit stream 114. Receiver logic 178 detects the first byte of a command and in response generates load signal 58. Clock signal 46 is also generated by receiver logic 178 to drive state register 50.

Microsequencer 42 and network interface 60 cooperate via control bus 54 which includes improper-byte-received signal 180. Other signals included in control bus 54, known in the art and not shown, orchestrate transfer of bytes between memory 64, register array 66, transmitter logic 160, and receiver logic 178. If an improper byte is received, as indicated by improper-byte-received signal 180, microsequencer 42 responds by reverting to an idle state and ignoring incoming bytes until another command is received.

For a detailed description of suitable circuits of the type that can be used for transmitters 118 and 164 and receivers 124 and 170, implemented in spread spectrum technologies, see U.S. Pat. No. 5,121,407 by Partyka et al., incorporated herein by reference.

FIG. 4 is a diagram of the packet format sent by commander station 10 to responder station 40. Each command packet 140 includes, in order of transmission, a preamble followed by a command followed by a postamble. The preamble and postamble are designed for synchronizing a transmitter circuit and a receiver circuit for a particular packet. In one embodiment, the preamble bit stream comprises 768 '1' bits followed by a 7-bit Barker code of '0001101'. In one embodiment, the postamble comprises a 7-bit Barker code of '1110010'.

In one embodiment, each bit of the command format is modulated using a pseudo noise (PN) sequence for direct sequence spread spectrum communication. The sequence is generated in part by a linear feedback shift register (LFSR) of the form [5,2]. In this form, the input to the first of five registers is the result of combining the output of register 5 by exclusive-OR with the output of register 2. The generator in this embodiment has 32 states so that the 1 and 0 states occur with equal probability. Since the LFSR generates only 31 states, an additional state is inserted by support circuitry. For a detailed description of a suitable PN modulator circuit of the type employed in transmitter 118 see "Spread Spectrum Systems", by R. C. Dixon, published by John Wiley and Sons, Inc. 1984 pp 15–28 and 56–151 incorporated herein by reference. Suitable demodulator techniques and circuits (of the type used in receiver 170 to recover the response format) are also described at pages 153–290 incorporated herein by reference.

FIG. 5 is a table that describes several commands and refers to command formats described in FIG. 6. As shown in FIG. 6, each command begins with an opcode and has one of four formats varying in length from 3 bytes to 258 bytes. Opcode values were selected to facilitate accurate decoding and obtain high noise immunity. Each byte is an 8-bit word as it would appear in output buffer 110 and on received message signal 182. The opcode hexadecimal value is stored on receipt in command register 56. Bytes following the opcode have the following meanings. MASK and BRANCH as used in format 142 are binary numbers chosen by a commander station to specify a group of responder stations that should act on the command and should reply. LOCAL ID in format 142 is a unique identification number assigned, for example, by the communication system installer to each commander station 10, 34 coupled to common medium 32. Responder stations 36, 40 coupled to common medium 32 can then direct a response to one of several commander stations 10, 34 by, for example, including a particular LOCAL ID in each response. When one commander station chooses to specify only one responder station that should act on a command and should reply, that commander station includes in its command an ARBITRATION NUMBER as in formats 144 and 146 identifying the responder station. An ARBITRATION NUMBER is a short value, for example 1 byte, chosen for self identification by a responder station. On the other hand, A TAG, as in format 146, is a long value, for example 8 bytes, assigned by a communication system designer at the time a responder station is manufactured or commissioned. The ARBITRATION NUMBER distinguishes responder stations when coupled simultaneously with at least one commander station to a common medium. However, the TAG, distinguishes responder stations throughout the life of the communication system application. Finally, DATA in format 146 includes some or all of the contents for any or all devices including memory 64, register array 66, flag register 84, and random number generator 90.

FIG. 7 is a diagram of the packet format sent by responder station 60 to commander station 10. Each response packet 190 includes, in order of transmission, a preamble followed by a response followed by a postamble. The preamble and postamble are designed for synchronizing a transmitter circuit and a receiver circuit for a particular packet. In one embodiment, the preamble bit stream comprises 768 '1' bits followed by a 7-bit Barker code of '0001101'. In one embodiment, the postamble comprises a 7-bit Barker code of '1110010'.

In one embodiment, each bit of the response format is modulated using a pseudo noise (PN) sequence for direct sequence spread spectrum communications. The sequence is generated in part by a linear feedback shift register (LFSR) of the form [6,1] or [8,4,3,2] for either a 64 chip sequence or a 256 chip sequence respectively. In the form [6,1], the input to the first of six registers is the result of combining the output of register 6 by exclusive-OR with the output of register 1. Similarly, for the [8,4,3,2] form, the input to the first of eight registers is the result of the exclusive-OR of the outputs of registers 8, 4, 3, and 2. The 64 chip sequence requires less time for signal synchronization than the 256 chip sequence; however, the latter provides better performance in systems having poor signal to noise ratio. The generator in this embodiment has an even binary multiple of states, so that the 1 and 0 states occur with equal probability. Since the LFSR generates one less state, an additional state is inserted by support circuitry. For a detailed description of a suitable PN modulator circuit of the type employed in transmitter 164, see "Spread Spectrum Systems", by R. C. Dixon, published by John Wiley and Sons, Inc. 1984 pp 15–28 and 56–151 incorporated herein by reference. Suitable demodulator techniques and circuits of the type used in receiver 124 to recover the response format are also described at pages 153–290 incorporated herein by reference.

FIG. 8 is a table that describes several responses and refers to response formats described in FIG. 9. As shown in FIG. 9, response formats 192–196 include LOCAL ID, ARBITRATION NUMBER, and TAG, which have the meanings already described above. By including LOCAL ID and ARBITRATION NUMBER in each response, in cooperation with locked bit 88 one responder station can respond-unambiguously to one commander station in the presence of a plurality of commander and responder stations. The INVERTED ARBITRATION NUMBER in format 192 is the binary ones-complement of the ARBITRATION NUMBER and is included for increased accuracy of communication. REVISION in format 192 is a one-byte value set by a communication system developer at the time of manufacture or commissioning of a responder station. REVISION represents the responder station configuration and connotes its capability. STATUS in format 196 is a one-byte code chosen by responder station 40 to convey current conditions of important system events such as low battery, uncorrectable data received, write protection, and similar information which may indicate to commander station 10 that communication should be repeated or abandoned. DATA in response format 194 includes some or all of the contents of any or all devices including memory 64, register array 66, flag register 84, or random number generator 90.

A communication system, according to the present invention, includes commander and responder stations that adhere to a method of communicating called a protocol. In general, the protocol of the present invention places different requirements on a commander station than on a responder station. Thus, there is a commander station method (FIG. 10) and a responder station method (FIG. 11). These methods together implement the communication system protocol.

Operation according to the present invention produces the following characteristic effects at the system level. First, a commander station will not begin transmitting during the transmission by another commander station or by a responder station. Operation, according to the present invention, does not prevent more than one commander station from beginning transmission simultaneously; however, it is feasible to couple commander stations to a second medium or to constrain commander stations to a second or expanded protocol on common medium 32. For example, commander stations 10 and 34 include personal computer system 12, which can be augmented with a peripheral controller for operation over ethernet. Communication over the second medium can be used to prevent simultaneous broadcast over common medium 32. For example, a second protocol on common medium 32 may include operator action to assign time slots, back off delays, or similar means for media access whether central or distributed. Several embodiments for these means for media access have been described by Stallings in his work already incorporated by reference above.

Second, a responder station will not transmit unless it has first received a command to which it determines it must respond. The response is made within a predetermined time immediately following receipt of the command.

Third, a commander station can form a command in a manner calling for all, more than one, or one responder station to respond. An important object of the communication system protocol in a communication system of the present invention, i.e. uninterrupted communication, is achieved after a commander station determines how to cause only one responder station to respond. The program flow diagram of FIG. 10 and the state diagram of FIG. 11 describe how uninterrupted communication between one commander station and each responder station is achieved when a plurality of commander stations and a plurality of responder stations are simultaneously coupled to a common medium.

Figure 10:
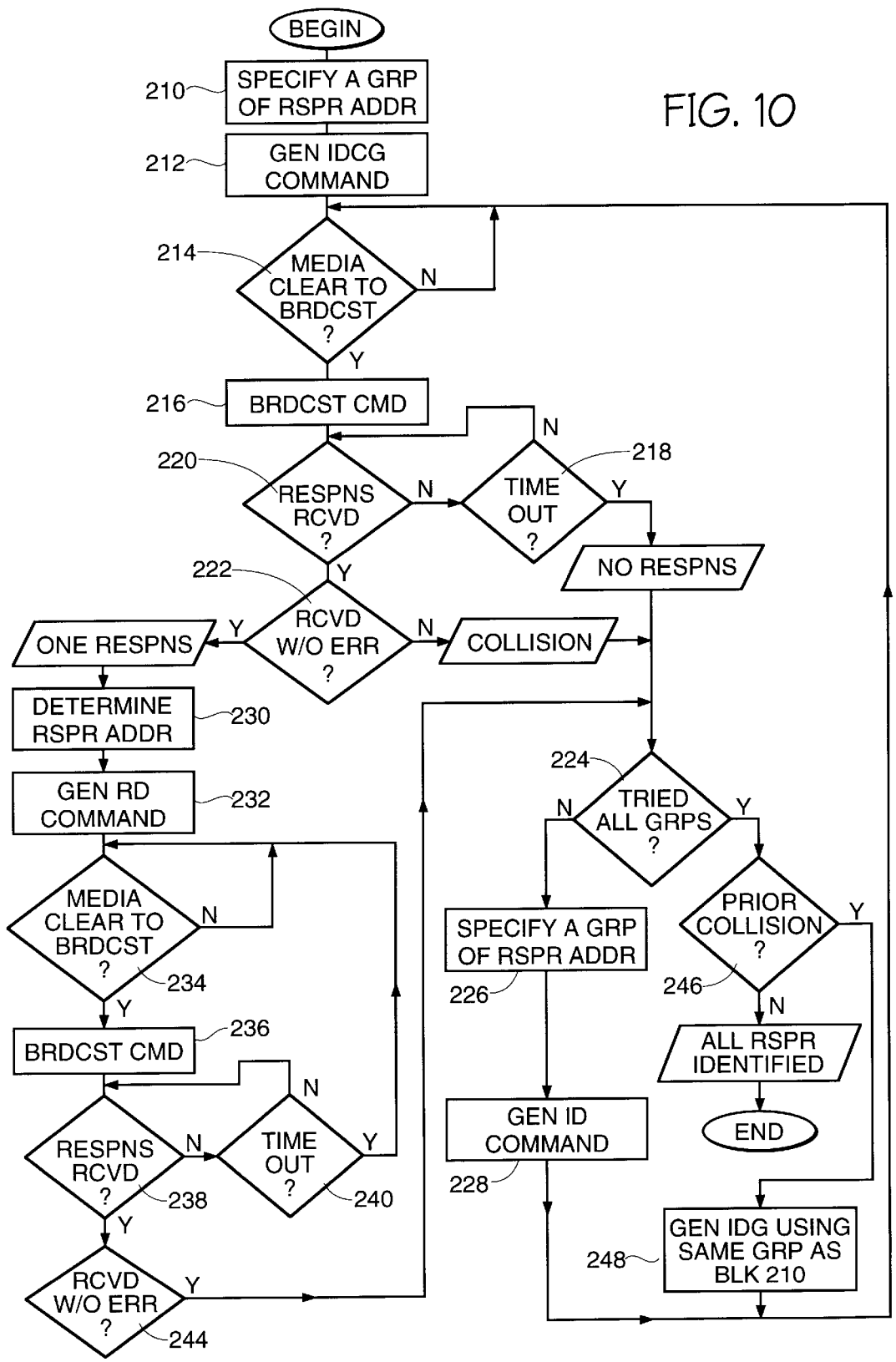
FIG. 10 is a program flow diagram of the protocol followed by a commander station of the present invention.
Figure 11:
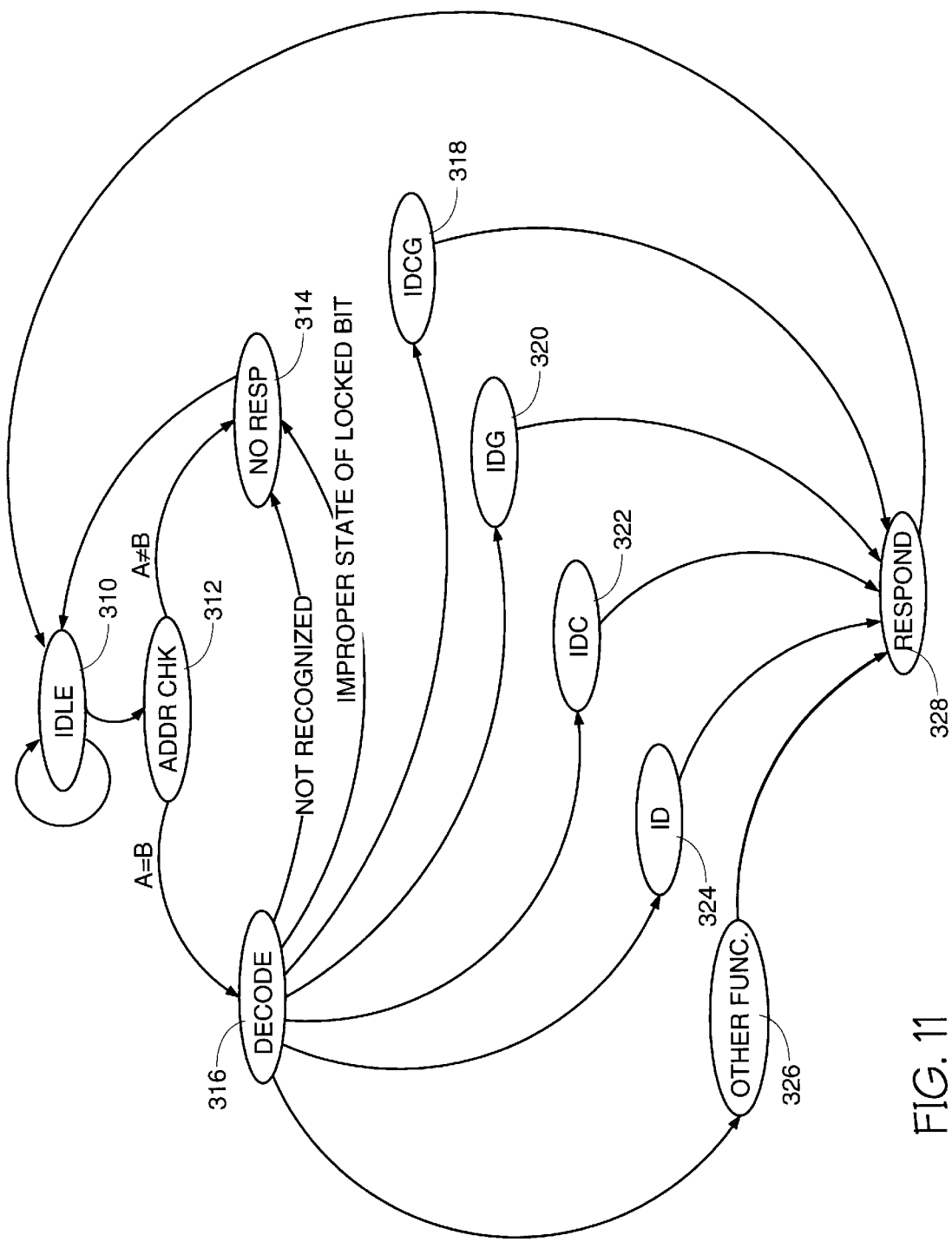
FIG. 11 is a state diagram of the protocol followed by a responder station of the present invention.

FIG. 10 is a program flow diagram of the protocol followed by a commander station of the present invention. A practical example of a communication system will be used to describe the flow diagram.

In a communication system for airport baggage handling the quantity and identity of responder stations within the radio communication range of a commander station varies over time. A commander station may be at a fixed operator station within radio range of a moving belt conveying baggage toward a Y-junction of conveyors. When baggage tags are constructed as responder stations and when each tag has destination information stored in memory 64, the commander station, through communication with each baggage tag, can control the routing of each bag through the junction onto one of two conveyors. Assume that each responder station also has information in memory 64 describing its sequential position on the conveyor. Such a sequence number could be a date and time of day when the bag passed through a chute upstream of the commander station.

As a group of bags approaches the commander station, the commander station has a fixed amount of time to determine the identity of each responder station, in order to establish uninterrupted communication. For proper baggage handling, the commander station must routinely and repeatedly identify all bags on the conveyor. To do so, at FIG. 10 block 210, commander station 10 specifies a group of responder station addresses by choosing values for BRANCH and MASK. BRANCH and MASK values are determined in a manner to be explained by reference to FIG. 12 below. In one embodiment, the initial group specification, i.e. BRANCH and MASK values, would specify all possible responder stations. Commander station 10 at block 212 generates an "identify, clear, and generate" (IDCG) command having a format according to FIGS. 4, 5, and 6. When the media is clear to broadcast, block 214, as indicated by OK-to-transmit signal 116, the IDCG message is broadcast, block 216. An IDCG message causes each responder station that is a member of the group to clear locked-bit 88, generate a random number and retain it as its ARBITRATION NUMBER, and broadcast a response. The responder station's reactions to ID, IDG, IDC, and IDCG commands are explained further in reference to FIG. 11 below.

Commander station 10 now loops through blocks 220 and 218 for a response to be received as indicated by OK-to-transmit signal 116 or a time out elapsed condition. If a response was received, as indicated by a false state of OK-to-transmit signal 116, commander station 10 at block 222 determines whether a collision occurred, as indicated by a false state of proper-message-received signal 132. If commander station 10 determines that a collision occurred, it will determine at block 224 whether all possible members of the initial group of responder station addresses specified at block 210 have been addressed in an ID, IDG, IDC, or IDCG command. How this determination is made will be further explained with reference to FIG. 12 below. If all subgroups have not been tried, the commander station again specifies a group of responder station addresses, for example, a subgroup or disjoint group of a prior group. At block 228 commander station 10 generates an ID command according to FIGS. 4, 5, and 6 and continues the method from block 214.

If, at block 218, a predetermined time elapsed without a false condition appearing on OK-to-transmit signal 116, commander station 10 concludes that no response was transmitted and continues the method at block 224.

If, at block 222, the proper-message-received signal is true, then commander station 10 concludes that only one responder station responded. At block 230, commander station 10 determines and validates the responding responder station's ARBITRATION NUMBER according to response format 192 using ARBITRATION NUMBER and INVERTED ARBITRATION NUMBER. According to a particular system communication objective, commander station 10 now selects a command from FIG. 5 which will cause the responder station to set its locked-bit 88. For determining baggage destination and positional sequence on the conveyor, commander station 10 could select RD. Using the appropriate command format shown in FIG. 6, commander station 10 generates a message at block 232, loops until the OK-to-transmit signal indicates that the medium is clear to broadcast at block 234, then broadcasts the command at block 236. Commander station 10 again awaits a proper response message by looping at block 238 through block 240. If a predetermined time elapses at block 240, commander station 10 continues the method at block 234. If a response is received without error at block 244, as indicated by proper-message-received signal 132, then two party uninterrupted communication between commander station 10 and one responder station 60 has been established. Further communication may be required, as indicated by the STATUS code in the received response format 192 or to accomplish other system communication objectives.

It is possible at block 224 for the commander station to determine that no further subgroup, super group, or disjoint group remains to be commanded using the ID command. Suppose, for example, that all practical values of BRANCH and MASK have been used. If the immediately preceding broadcast at block 216 elicited no response at block 218, then commander station 10 can conclude that all responder stations have been identified. Otherwise, at block 248, commander station 10 generates an identify and generate command (IDG) according to the format in FIGS. 4, 5, and 6 using the same group that was specified in block 210. Commander station 10 continues the method at block 214.

Although the same group is specified, a responder station that has been identified at block 244 will not respond, since its locked-bit 88 has been set. Collisions are less likely to occur with each pass through the loop from block 214 to block 248 because a smaller number of responder stations can respond. Hence, the method of FIG. 10 converges toward identifying all responder stations. The communication system designer must select the precision of BRANCH and MASK values to assure conversion within system time allowances, for example, 8-bit BRANCH and MASK values are compatible with conveyor speeds and radio ranges needed for airport baggage handling.

FIG. 11 is a state diagram of the protocol followed by a responder station of the present invention. Responder station 40, begins in idle state 310 when power is applied or restored according to wake-up signal 174. In part, the idle state is indicated by contents of command register 56 not corresponding to a valid command. The idle state is re-entered to interrupt command processing when improper-byte-received signal 180 is raised by receiver logic 178. A valid command loaded into command register 56 causes state transition to address check state 312.

In address check state 312, microsequencer 42 determines whether responder station 40 has been addressed by one of two methods. First, if the command conforms to format 142, the responder station is addressed when the result of ARBITRATION NUMBER logically ANDed with MASK is bitwise identical to BRANCH. ARBITRATION NUMBER is the current contents of a particular register in register array 66. MASK and BRANCH are values received in the command and stored in register array 66. Logical operations and comparisons are performed by ALU 72 which produces A=B signal 82. If A=B signal 82 is not asserted, state 314 is entered. Responder station 40 may remain in state 314 until a predetermined time elapses. Responder station 10 re-enters idle state 310, after the predetermined time elapses.

To illustrate the importance of such a delay, suppose that commander and responder stations employed radio transceivers for network interfaces 60 and 26. Then, suppose responder station 40 is within range of two commander stations 10 and 34, but commander stations 10 and 34 are out of range of each other. When commander stations 10 and 34 validly produce back to back commands, the delay interposed by state 314 prevents responder station 40 (not addressed by commander station 10 in the first occurring command) from responding to commander station 34 in the second occurring command. Without the delay, a collision could occur that may confuse commander station 10.

A second way to determine whether responder station 40 has been addressed applies for commands having formats 194 and 196. Accordingly, responder station 40 is addressed when ARBITRATION NUMBER, retained in register array 66, is bit-wise identical to ARBITRATION NUMBER as received in the command. Comparison is performed by ALU 72 which produces A=B signal 82. If A=B signal 82 is not asserted, state 314 is entered as already described. Otherwise, transition is made to decode state 316.

Decode state 316 follows address check state 312 in response to A=B signal 82. If the command opcode is not recognized then no response state 314 is entered. For some commands, a further condition such as the state of locked-bit 88, if not met, will cause the command to be treated as not recognized. Each recognized command opcode causes microcode execution to begin at a section of microcode for the purpose of directing microseqencer operations to process the particular received command. Four commands are illustrated as separate states 318 through 324 and other commands are illustrated in summary by pseudo state 326.

When the opcode for command IDCG has been received, state 318 is entered for identify, clear, and generate operations. An IDR response (according to FIGS. 8 and 9) is selected, locked-bit 88 is cleared, the content of random number generator 90 is stored in register array 66 as ARBITRATION NUMBER, and transition is made to state 328.

When the opcode for command IDG has been received and locked-bit 88 is not set, state 320 is entered for identify, and generate operations. An IDR response is selected and a new ARBITRATION NUMBER is generated as already described for state 318. Transition is then made to state 328.

When the opcode for command IDC has been received, state 322 is entered for identify and clear operations. An IDR response is selected and locked-bit 88 is cleared. Transition is then made to state 328.

When the opcode for command ID is received and locked-bit 88 is not set, state 324 is entered for an identify operation. An IDR response is selected. Transition is then made to state 328.

When the opcode for other commands (including RD and WD) is received, locked-bit 88 may be set and other functions may be performed. Other functions may include writing data to memory 64, writing data to register array 66, altering the state of registers including flag register 84, and other operations controlling responder station configuration and operation. Transition is then made to state 328.

Upon transition to state 328, the response selected by a prior state is generated according to FIGS. 7, 8, and 9 and broadcast. In one embodiment, the response is broadcast as it is being generated. Transition to idle state 310 is made, after broadcasting the response. Note that responder station 40 does not wait for clear medium prior to broadcasting the response. According to the present invention, collision detection by responder stations is not necessary to accomplish uninterrupted communication.

The ARBITRATION NUMBER generated by responder station 40 and the BRANCH and MASK numbers chosen by commander station 10 operate to establish uninterrupted communication. We now turn to a further explanation of the method used by commander station 10 to choose BRANCH and MASK values.

Figure 12:
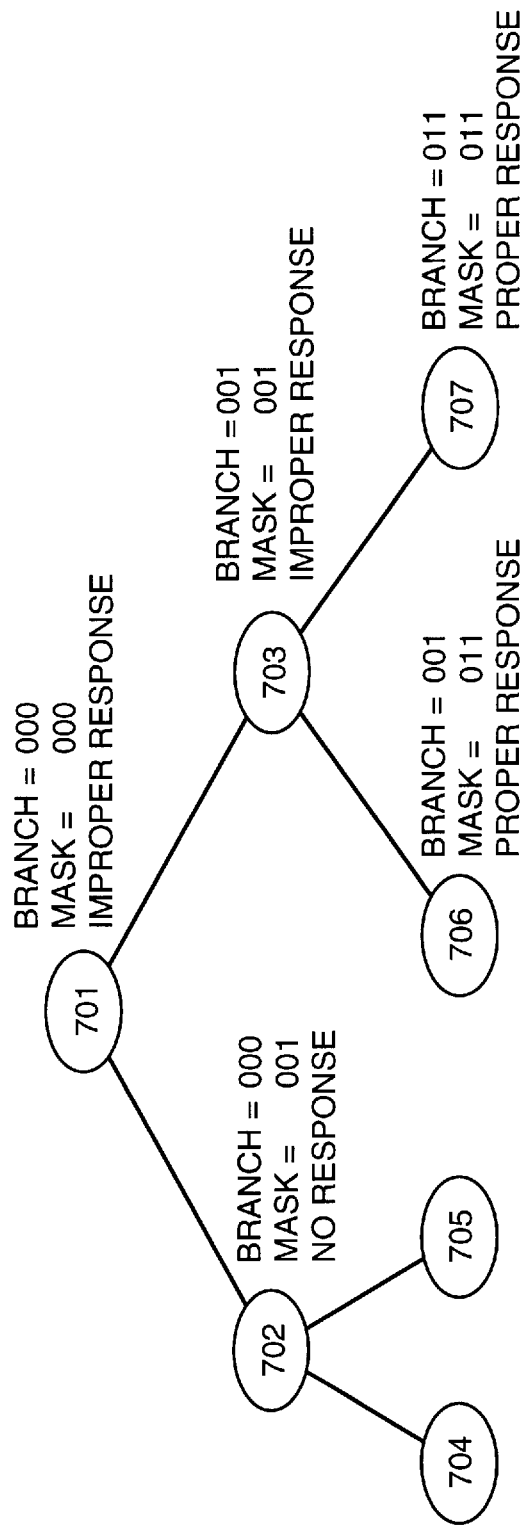
FIG. 12 is a binary tree diagram of BRANCH values and MASK values chosen by a commander station.

FIG. 12 is a binary tree diagram of BRANCH values and MASK values chosen by a commander station. A tree is a type of graphic representation. There are several types of trees known in mathematics and computer science. The tree depicted is a binary tree where a node can have two branches, shown descending left and right from a node. Each node corresponds to a unique combination of values for BRANCH and MASK, which are n-bit binary numbers having the same precision. As illustrated, BRANCH and MASK are 3-bit binary numbers. In a communication system for airport baggage handling, 8-bit numbers would be used. The precision employed for BRANCH and MASK must be identical to the precision selected for ARBITRATION NUMBER generated by responder station 40.

Recall that responder station 40 uses the expression ARBITRATION NUMBER AND MASK=BRANCH to determine if it is addressed, where ARBITRATION NUMBER is the value retained in register array 66 from random number generator 90. When MASK is 0 and BRANCH is 0 all values of ARBITRATION NUMBER satisfy the expression, i.e. all responder stations coupled to common medium 32 conclude they are addressed. On the other hand, if MASK has a '1' bit in every position, then the expression is satisfied for only one value of ARBITRATION NUMBER.

When MASK is arranged with '0' and '1' bits, the expression is satisfied by a group of values for ARBITRATION NUMBER, and potentially a group of responder stations could conclude they are addressed. Note for a responder station to be addressed, BRANCH at bit position 'q' must be '0' when MASK at bit position 'q' is '0', for all values of 'q'. When MASK at bit position 'g' is '1', BRANCH can take two values for that bit position which correspond to the left and right branches of a binary tree.

At the first level of the tree, nodes 702 and 703, MASK is '1' in bit position 'r'. The corresponding bit position of BRANCH is '0' at node 702 and '1' at node 703. At the second level of the tree, nodes 704 through 707, MASK is '1' at bit positions 'r' and 's'. For example, the value for BRANCH at node 707 is the parent node BRANCH value (001 at node 703) modified by forcing a '1'(for the right-hand branch) at bit position 's', hence 011. In like manner, the BRANCH and MASK values for any node in the tree can be determined. In FIG. 12 MASK bit positions have been given in an order right to left. Any other order of bit positions would be equivalent. Methods for choosing first and subsequent values for BRANCH and MASK can now be explained in terms of traversing from node to node on a binary tree.

When commander station 10 broadcasts a request for identification (an ID, IDC, IDG, or IDCG command) one of three events can occur. BRANCH and MASK values given at a particular node that represents a first group of responder stations. First, commander station 10 could receive no response from which it could conclude that no responder station in the first group is currently coupled to the common medium 32. Second, a proper response could be received. From that event, commander station 10 could conclude that only one responder station in the first group is currently coupled to common medium 32. Third, from an improper response received, commander station 10 could conclude that a collision of more than one response occurred. An improper response could be caused by, for example, weak coupling, high noise levels, or weak received signals. However, these causes can be treated in the same way as a collision to simplify the commander station protocol without substantially degrading system performance for applications including airport baggage handling. Therefore, an improper response simply merits further search.

An efficient search for the identity of each of several responding responder stations is equivalent to an efficient search for the leaves of a binary tree. A leaf is a node having no further branches. When use of the values for BRANCH and MASK at a node produces no collision, the node is a leaf. Tree search methods are easily implemented using known computer programming methods.

Tree search methods are essentially of two types, breadth first and depth first. A particular communication system application may use one method or the other to optimize commander station computing time and memory space objectives. An explanation of these methods using the programming language PASCAL is given by E. Horowitz and S. Sahni in "Fundamentals of Data Structures in PASCAL" pp 203–265 and 326–332 published by Computer Science Press Inc., Rockville, Md. (1984), incorporated herein by reference.

Suppose that two responder stations 40 and 36 and one commander station 10 are coupled to common medium 32. The binary tree in FIG. 12 illustrates a sequence of BRANCH and MASK values used by commander station 10 to identify responder stations. Timing diagrams in FIGS. 13 and 14 illustrate the same sequence showing decisions at commander station 10 decision blocks (according to the commander station method of FIG. 10) and responder station control signals (according to the responder station method of FIG. 11) as commander station 10 establishes uninterrupted communication with each responder station.

Figure 13:
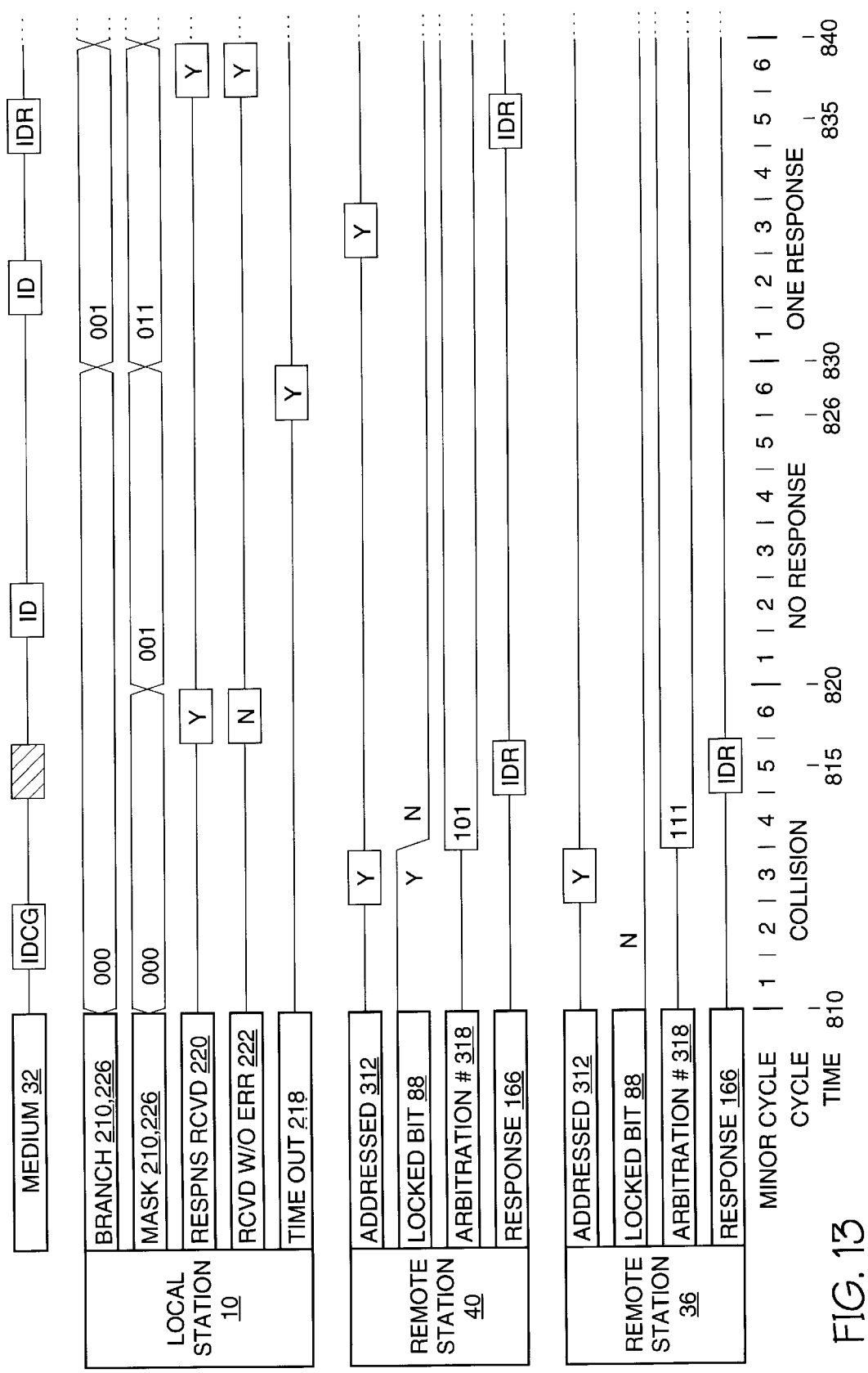
FIGS. 13 and 14 are timing diagrams depicting signals in one commander station according to the method of FIG. 10 and of two responder stations according to the method of FIG. 11 as the commander station establishes uninterrupted communication with each responder station.
Figure 14:
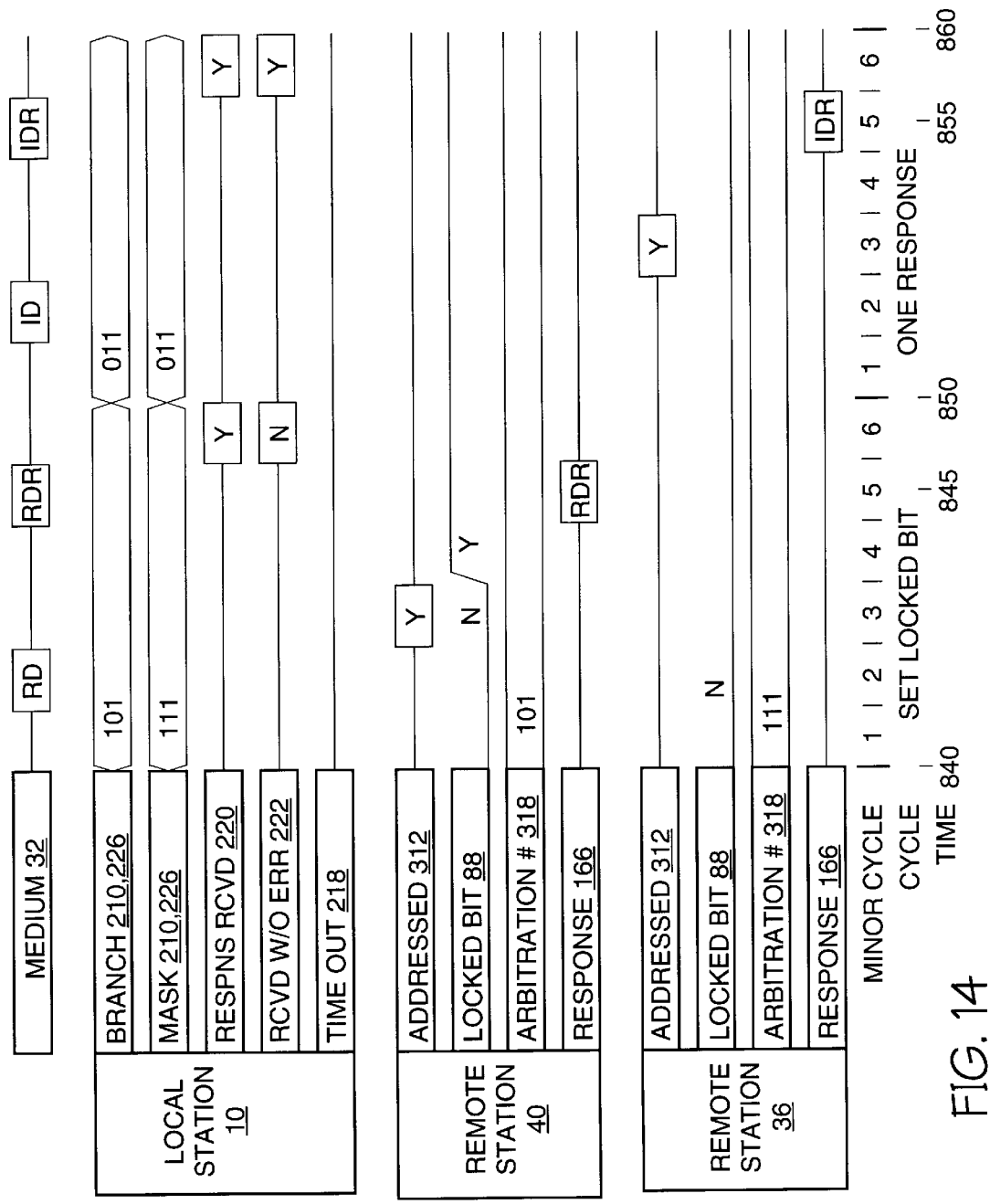

Beginning at FIG. 10 block 210, FIG. 12 node 701, and FIG. 13 time 810, commander station 10 chooses BRANCH=000 and MASK=000, calling for all responder stations to respond. At time 815, responder station 40 has determined that it is addressed, has cleared its locked-bit 88, has generated ARBITRATION NUMBER 101, and has begun transmitting response IDR. Simultaneously, responder station 36 has determined that it has been addressed, has generated ARBITRATION NUMBER 111, and has begun transmitting response IDR. Also, at time 815, simultaneous transmissions collide on common medium 32.

At time 820, commander station 10 at block 226 chooses node 702 having BRANCH=000 and MASK=001.

Responder station 40 is not addressed because ARBITRATION NUMBER (101) ANDed with MASK (001) yields 001 which is not equal to BRANCH (000). Similarly, responder station 36 is not addressed. Neither station responds. At time 826, time out at block 218 occurs.

At time 830 and block 226, a third group of responder station addresses is chosen. From FIG. 12 the appropriate group is specified by traversing the tree according to a search method. If a breadth first search were used, all nodes at the same level would be visited before testing at a deeper level. Hence, node 703 would be next. If a depth first search were used, search would proceed upward from node 702 (because it is a leaf) and then downward from the first node having an untested branch. Hence, up to node 701 and down to node 703. As a refinement to either method, node 703 can be skipped because a collision at node 701 and no response at node 702 implies a collision at node 703 without testing. A depth first search would now traverse from node 703 directly to node 706. A breadth first search would first consider nodes 704 and 705 and conclude not to visit them because each is a descendent from a leaf node.

Having selected node 706 at time 830, commander station 10 broadcasts an ID command with BRANCH=001 and MASK=011 at block 216. At time 835 responder, station 40 has determined that it is addressed and has begun transmitting response IDR. Simultaneously, responder station 36 determines it is not addressed and remains in state 314. At time 840, shown on FIGS. 13 and 14, commander station 10 has received the response from responder station 40 as a proper message, concluded that only one responder station responded, derived received ARBITRATION NUMBER (101), set BRANCH to received ARBITRATION NUMBER, set MASK to all 1's so that a responder station must match ARBITRATION NUMBER (101) in all bit positions to respond, and begins to perform blocks 232 through 244 in FIG. 10. At time 845, responder station 40 has determined that it is addressed, has decoded a read command, has set its locked-bit 88 in state 326, and has begun generating the read response in state 328. At time 850, commander station 10 has received the response as a proper message. Thus, commander station 10 has conducted a first two-party uninterrupted command-response scenario from time 840 to time 850 with one responder station.

The search by commander station 10 for another responder station proceeds from block 244 to block 224 in FIG. 10. At block 226, another node from FIG. 12 is selected. Having elicited a proper response at node 706, the depth first search proceeds up to the first node having an untested branch, here node 703. Then, down the untested branch to node 707. Having selected node 707 at time 850, commander station 10 broadcasts an ID command with BRANCH=011 and MASK=011 at block 216. At time 855, responder station 36 has determined that it has been addressed and has begun generating an IDR response. At time 860, the response is received by commander station 10 as a proper message. After time 860, events proceed in a manner similar to events from time 840 to time 850, as commander station 10 conducts a second two-party uninterrupted command-response scenario with a second responder station.

At block 224, following the uninterrupted scenario, commander station 10 can conclude that all groups have been tested. On a depth first search, a proper response or no response at a node having BRANCH=MASK indicates all groups have been tested. On a breadth first search, all groups have been tested when an investigation of all levels up to the level having all MASK bits set to '1' yields no node that is not descendent from a leaf node.

In a branch/mask embodiment of the type described above, a responder station concludes that it has been addressed when ARBITRATION NUMBER logically ANDed with MASK is equal to BRANCH. Two other types of embodiments will now be described that lie within the scope and spirit of the present invention. First, in an example of a high/low embodiment, BRANCH and MASK (as shown in format 142) are replaced with HIGH LIMIT and LOW LIMIT. Each of these limit values has the same precision as the MASK value. Using these limit values, responder station 40 concludes that it is addressed when HIGH LIMIT is greater than or equal to ARBITRATION NUMBER, and LOW LIMIT is less than or equal to ARBITRATION NUMBER. Second, in an example of a limit/bound embodiment, BRANCH and MASK (as shown in format 142) are replaced with a single LIMIT value having the same precision as MASK. Using a value called BOUND which by design choice may be 0 or the maximum permitted by the precision of LIMIT, responder station 40 concludes that it is addressed when ARBITRATION NUMBER is between BOUND and LIMIT, inclusive of both BOUND and LIMIT values.

An example of a limit/bound embodiment is implemented with a structure similar to that already described for the branch/mask embodiment. Subtraction capability or equivalent must be added to ALU 72. Operation of microsequencer 42 must be revised to perform the arithmetic operations outlined above in state 312 shown on FIG. 11. The high/low embodiment is implemented with the structure already described for the limit/bound embodiment.

In FIG. 10 (blocks 210 and 226) commander station 10 specifies a group of responder station addresses. For a branch/mask embodiment, a method using the binary tree of FIG. 12 has already been discussed. For a high/low embodiment, a similar binary tree (not shown) with HIGH and LOW values at each node is used. At the root node, LOW is 0 and HIGH is the maximum value permitted by the precision of the value HIGH. At a node on the lower left from a parent node, the value of LOW is the value of LOW at the parent node and the value of HIGH is a value ½the value of HIGH at the parent node discarding a remainder, if any. At a node on the lower right from a parent node, the value of HIGH is the value of HIGH at the parent node and the value of LOW is ½the value of HIGH at the parent node plus one. Although a binary tree has been described, a tree having more than two branches at each node can be employed to practice the present invention as is readily apparent to those skilled in the art. Trees with varying number of branches at each node can also be employed. Operation of the high/low embodiment is otherwise identical to operation of the branch/mask embodiment already discussed.

In a limit/bound embodiment, the method used to specify a group of responder station addresses is similar to the method described for a high/low embodiment with a minor variation in the tree. When BOUND is zero, then the value for LOW is not used and the value for HIGH is used as the LIMIT value at each node. When BOUND is a maximum value, then the value for HIGH is not used and the value of LIMIT at each node is the value of LOW. Operation of a limit/bound embodiment is otherwise identical to operation of a branch/mask embodiment already discussed. Note that the command at block 232 on FIG. 10 sets locked-bit 88 to prevent unnecessary collisions when an ID command using LIMIT is broadcast subsequently at block 228.

Figure 15:
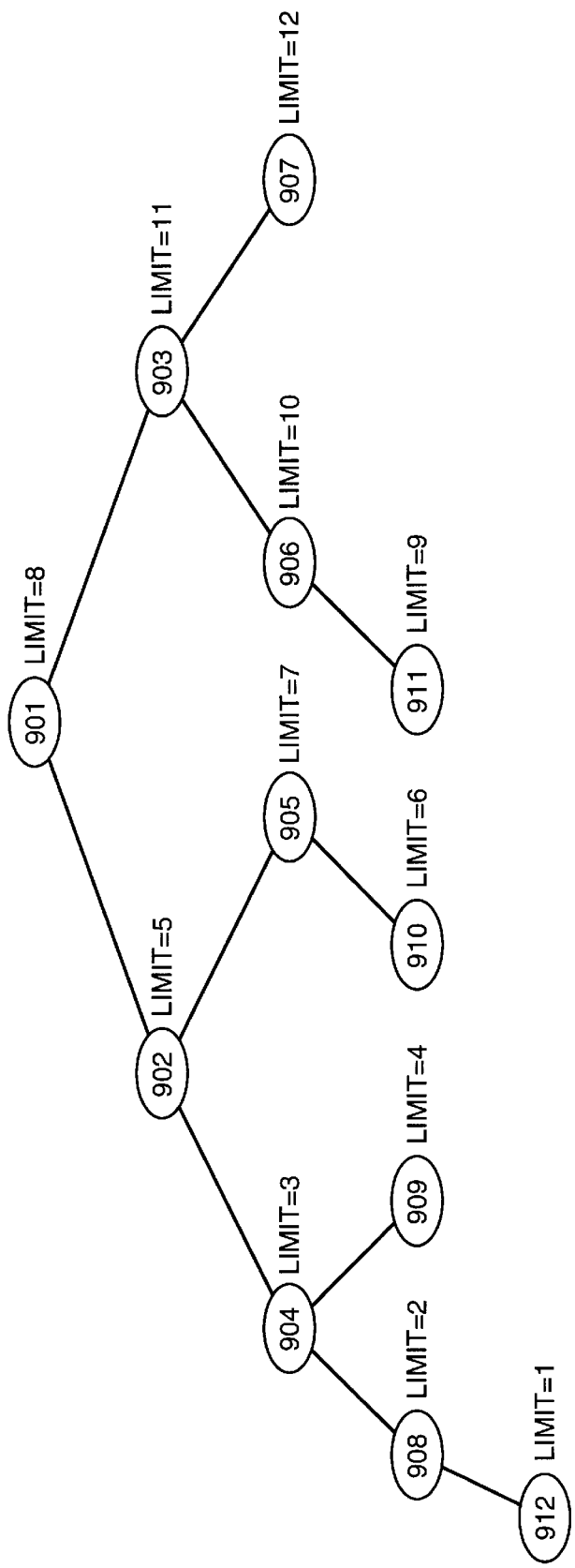
FIG. 15 is a fibonacci tree diagram of LIMIT values chosen by a commander station.

FIG. 15 is a fibonacci tree diagram for use in an example of an embodiment of the type already described as limit/bound. An advantage of using a fibonacci tree is that the LIMIT value for a node descendent from a parent node can be derived without a multiplication or division operation. In systems where it is desirable to improve calculation speed or reduce the complexity of circuitry and software at commander station 10, the fibonacci tree is used. An implementation of a high/low embodiment using a fibonacci tree similar to FIG. 15 is within the ordinary skill of the systems design and programming arts.

As described in several embodiments above, a commander station can quickly determine the identity of all responder stations coupled to a common medium at a given time. After the identity of a responder station has been determined, a commander station can conduct uninterrupted communication at any subsequent time using the responder station's ARBITRATION NUMBER. Since the ARBITRATION NUMBER is not unique, there is some risk that at a subsequent time, more than one responder station having a given value for ARBITRATION NUMBER may become coupled to the common medium. For increased accuracy, use of a unique responder station identity, such as the TAG field in format 146 of FIG. 6, may be used for subsequent communication.

When more than one commander station is coupled to a common medium, it is possible for one commander station to thwart the objective of a second commander station. For example, when commander station 10 is attempting to identify all responder stations and commander station 34 issues an IDCG command, commander station 10 may subsequently incorrectly conclude that all responder stations have been identified. Several methods of preventing this incorrect conclusion are available to those skilled in communication and computer programming arts. Exemplary methods include enabling a commander station to monitor commands issued by another commander station to avoid inappropriate conclusions; enabling a commander station 10 to record the TAG fields sent in messages to another commander station and communicate directly with each such responder station, perhaps prior to and so simplifying, the task of identifying all responder stations; modifying the communication protocol used among commander stations; and causing a second commander station to delay its own attempt to identify all responder stations until after a time sufficient for a first commander station to identify all responder stations. The latter suggestion is practical using the media access control scheme of the present invention. It is practical because the time required to identify a worst-case population of responder stations can be predetermined.

The present invention can be implemented in several alternate embodiments. As already discussed, various alternatives are available for common medium 32 including all media that support forms of electromagnetic energy, all sound, vibration, and pressure wave conducting media, and all media capable of transporting variation in chemical concentration, to name a few. If a medium other than radio communication is selected as an embodiment of the present invention, variations in network interface 26 and 60 can be made by those skilled in the arts that apply to the selected medium. Appropriate signal sensors and generators are well known in applications including measurement and control apparatus. Packet synchronization techniques, packet formats, error detection techniques, and error correction techniques may vary or be omitted as a matter of design choice depending on the need for receiver synchronization, the signal to noise properties of the selected media, and the desired simplicity of network interfaces.

Another group of alternative embodiments uses various means to specify a set of responder station identities or designations. The embodiments described above employ an ARBITRATION NUMBER selected from a predetermined range of numbers and expressed as part of a message. For example, alternate sets of designations include a set of operating modes, a set of modulation techniques, and a range of values used to shift in time all or a portion of a command. Various alternatives are also available for specifying (i.e. addressing) a subset of designations. The branch/mask, high/low, and limit/bound subset addressing techniques can each be applied to one or more parametric quantities related to the above mentioned set designations. For example, if one member of the set is characterized by a bandwidth, a channel frequencies, a phase variation, or a duration in time, then a range of each of these parameters could be described by a branch/mask pair of values.

Various alternatives for transmitting the command signal are within the scope of the present invention. In the embodiments described at length above, the BRANCH and MASK values in the message format characterize the transmitted command signal according to a subset of responder stations to which the command is directed. In addition to the variations in modulation already described, the transmitted signal can be characterized by variation in the spread spectrum chip sequence or initial code within a chip sequence when spread spectrum transmission is employed.

Other characteristics of a command signal can be used to limit or expand the subset of responder stations to which the command is directed. For example, the operation of commands including RD and WR to set locked-bit 88 and the operation of commands including IDG and IDCG to conditionally clear locked-bit 88 show how the command opcode can be used to characterize a command signal according to a selected subset or address range. Alternatively, modulation variations, timing variations, or other message content variations could also be used to set or clear an equivalent of the locked-bit function.

Various means are suitable for use by a responder station to determine whether it is addressed by, i.e. whether it is a member of the subset indicated by, a command signal. Several arithmetic comparison techniques based on message content have been described above. Other means, based on whether the signal received by the responder is received without error, are appropriate when variations in modulation are used to address a subset of responder stations. For example, received signal strength below a threshold over one or more frequencies or at a particular time could cause commands to be received or rejected. Similarly, operation of functions similar to locked-bit 88 as already described and variation in spread spectrum chip sequence could be used to cause commands to be received or rejected.

Within the scope of the present invention, each responder station includes means for establishing a self designation. In the embodiments discussed at length above, the self designation is determined by a random number generator, held in a register, and included in a response packet. Alternative techniques include various means for sampling a random process to acquire an analog parametric value and using either a digital or an analog value to control the functions of network interface 60.

Network interface 60 can be constructed and operated in several alternative embodiments to transmit a response packet in a way characterized by the responder station self designation. All of the following variations could be used in embodiments that fall within the scope of the present invention: variations in the modulation technique, including variation within a range of values used to shift in time all or a portion of a response; variation in the spread spectrum chip sequence or initial code within a chip sequence when spread spectrum transmission is employed; variation in message content including preamble, postamble, response type indicator e.g. IDR, RDR, and WDR, register contents, status and locked-bit information; and variation based on signal rejection including variation in bandwidth, channel frequencies, signal phase variations, signal duration, or variation in the redundancies used to detect or correct transmission error.

Another group of alternative embodiments uses alternative means for selecting a subgroup in response to collision detection. The tree search method that was described as part of the commander station protocol can be implemented in various ways depending on the selected representation of the tree in commander station memory 18. Binary trees have been described above. Other tree structures including n-ary trees could be employed to perform the commander station identification function in an equivalent manner. Depending on the type of tree selected for representation, the use of strings, arrays, stacks, pointers, linked lists, or derivative memory organizations are feasible and equivalent. Finally, tree search methods include depth first, breadth first, and combinations of both depth and breadth searching.

Each computer used as part of commander station 10 and as part of responder station 40 includes hardware and software designed to conduct the protocol shown and described in FIGS. 10 and 11 respectively. Variations in the extent and complexity of hardware and software are well known by designers of ordinary skill in communication and computer arts. Equivalent hardware can include the general purpose computer such as an IBM PC; a calculator, such as an HP21C; the special purpose computer, such as application specific automated controllers used in weighing systems; the microprocessor based system, such as a circuit using an Intel 8048; the microsequencer based system using programmable devices and logic devices; and the integrated circuit or chip set, such as developed from a cell library using semiconductor device design techniques. Variations in the extent and complexity of software compatible with one or more of the above mentioned hardware variations are also well known by the programmer of ordinary skill.

The systems designer of ordinary skill chooses to implement each control function in either hardware or software or a combination of both. A computer is said to conclude a certain result when it has determined the state of a control function. When a control function is implemented using a computer system, variations in the form of the result of the control function are well known. For example, a parameter that results from a first control function and is relied upon by a second control function can take the form of a signal when the second control function is in part hardware or the form of a pointer, value, or symbol stored in a register or memory when the second control function is in part software.

The present invention has been described in the preferred embodiment. Several variations and modifications have also been described and suggested. Other embodiments, variations, and modifications known to those skilled in the art may be implemented without departing from the scope and spirit of the invention as recited in the claims below.

What is claimed is:

1. A communication system comprising:
   a) a communication medium;
   b) a plurality of first stations, each first station coupled to the medium and each comprising:
   1) a first receiver for receiving a command signal, the command signal comprising a first address, the first address for exciting a response from a first portion of the plurality, 2) means, responsive to the command signal, for selecting a temporary self designation from a predetermined set of designations, the number of members in the set being more than one, and 3) a first transmitter for transmitting a reply signal characterized by the self designation, each of the first portion of the plurality transmitting substantially simultaneously after reception of the command signal; and c) a second station coupled to the medium comprising:

1) a second transmitter for transmitting the command signal, 2) a second receiver for receiving the reply signal, 3) means for determining the self designation from the reply signal, 4) a first circuit for providing a collision detection signal, and 5) means responsive to the collision detection signal for specifying a second address different from the first address, the second address for exciting a second portion of the plurality.

2. A commander transceiver comprising:

a transmitter circuit for transmitting a Generate command message;

a receiver circuit for receiving response messages subsequent to the transmitting of a Generate command message, wherein each response message includes an address identifying a station which transmitted that response message; and a logic circuit for determining whether the receiver circuit receives a plurality of response messages which include the same address and, if so, controlling the transmitter circuit to transmit another Generate command message.

3. An RF communications system, comprising:

a number of commander transceivers, wherein each commander transceiver includes a transmitter circuit for transmitting a number of interrogation messages, wherein each interrogation message specifies for response a set of addresses, and a receiver circuit for receiving response messages; and a plurality of responder transceivers for responding to the interrogation messages, wherein each responder transceiver includes a first memory for storing an address which identifies the responder, a second memory for storing a binary waiting flag having an on state and an off state, a receiver circuit for receiving the interrogation messages, a transmitter circuit for transmitting the response messages, a first logic circuit for detecting when the receiver circuit of the responder receives an interrogation message, and a second logic circuit, responsive to an interrogation message being detected by the first logic circuit of the responder, for determining whether said interrogation message specifies for response a set of addresses which includes the address stored in the first memory of the responder and if the determination is negative, then setting the waiting flag in the second memory of the responder to the on state during a period of time, and then setting the waiting flag to the off state after said period, otherwise, if the determination is affirmative, and if the responder's waiting flag is off, then controlling the transmitter circuit of the responder to transmit a response message.

4. A system according to claim 32, wherein said period of time following one interrogation message being detected is great enough that any response message transmitted by one of the responder transceivers after the waiting period will not collide with any response message transmitted by any other responder transceiver in response to said one interrogation message.

5. An RF communications system, comprising:

a commander transceiver, including a transmitter circuit for transmitting command messages, a first commander logic circuit for controlling the commander transmitter circuit to transmit a Clear Response Lock command message and then transmit a number of Identify command messages, a receiver circuit for receiving response messages, and a second commander logic circuit for determining when the receiver circuit receives an undamaged response message which contains an address and, if so, controlling the transmitter circuit to transmit a Set Response Lock command message addressed to the address contained in said undamaged response message; and a number of responder transceivers, wherein each responder transceiver includes a first memory for storing an address identifying the responder transceiver, a second memory for storing a Response Lock flag having a Clear value or a Set value, a receiver circuit for receiving command messages from the commander transceiver, a transmitter circuit for transmitting response messages to the commander transceiver, a first responder logic circuit for determining whether the responder's receiver circuit receives a Clear Response Lock command message and, only if so, storing the Clear value into the responder's second memory, a second responder logic circuit for determining whether the responder's receiver circuit receives a Set Response Lock command message and, only if so, storing the Set value into the responder's second memory, and a third responder logic circuit for determining whether the responder's receiver circuit receives an Identify command message and determining whether the value of the responder's Response Lock flag is Clear and, only if both determinations by the third responder logic circuit are affirmative, controlling the responder's transmitter circuit to transmit a response message containing the address stored in the responder's first memory.

6. An RF communications system, comprising:

a number of responder transceivers, wherein each responder transceiver includes a first memory for storing an address identifying the responder transceiver, a receiver circuit for receiving command messages, a transmitter circuit for transmitting response messages, a first responder logic circuit for determining whether the responder's receiver circuit receives a Generate command message and, only if so, choosing an address for the responder and storing the chosen address in the first memory, and a second responder logic circuit for determining whether the responder's receiver circuit receives an Identify command message and, only if so, controlling the responder's transmitter circuit to transmit a response message containing the address stored in the responder's first memory; and a commander transceiver, including a transmitter circuit for transmitting command messages to the responder transceivers, a receiver circuit for receiving response messages from the responder transceivers, a first commander logic circuit for controlling the commander's transmitter circuit to transmit a first Generate command message and then transmit a number of Identify command messages, and a second commander logic circuit for determining whether any response messages received by the commander's receiver circuit indicate a likelihood that multiple responder transceivers are identifying themselves by the same address and, only if so, controlling the transmitter circuit to transmit a second Generate command message.

7. A system according to claim 6, wherein the first logic circuit of each responder chooses that responder's address independently of other responder transceivers' choosing their respective addresses.

8. A system according to claim 6, wherein:

the address stored in the first memory of each responder transceiver has a predetermined number of bits;

each Identify command message specifies for response a subset of addresses which is less than or equal to the entire set of addresses which can be represented by said predetermined number of bits;

the second logic circuit in each responder transceiver does not control the responder's transmitter circuit to transmit a response message upon an Identify command message being received by the responder's receiver circuit unless the Identify command message specifies for response a subset of addresses which includes the address stored in the first memory of that responder;

the first commander logic circuit controls the commander's transmitter circuit to transmit a plurality of Identify messages which specify for response different subsets of addresses; and the second commander logic circuit determines that none of the individual addresses within the subset specified in an Identify message transmitted by the commander identifies multiple responder transceivers if the commander receives response messages from either zero or one responder transceiver in response to said Identify message being transmitted.

9. An RF communications system, comprising:

a plurality of responder communications transceivers, wherein each responder transceiver includes a memory for storing an arbitration address which identifies the responder, a receiver circuit for receiving command message signals, a first logic circuit for detecting whether a signal received by the receiver circuit is a Generate command message, and a second logic circuit, responsive to a Generate command message being detected by the first logic circuit, for randomly choosing a new value for the arbitration address and storing the newly chosen address in the memory; and a commander communications transceiver having a transmitter circuit for transmitting Generate command messages to the responder transceivers.

10. A system according to claim 9, wherein:

each responder transceiver further comprises a transmitter circuit for transmitting a response message containing the arbitration address stored in the memory of the responder; and the commander transceiver further comprises a receiver circuit for receiving response messages from the responder transceivers.

11. A system according to claim 10, wherein the receiver circuit of the commander transceiver further comprises:

a commander logic circuit for determining whether the receiver circuit has received response messages from different responder transceivers with the same arbitration addresses and, if so, then controlling the transmitter circuit of the commander transceiver to transmit a Generate command message.

12. A system according to claim 9, wherein the second logic circuit of each responder transceiver chooses the arbitration address of that responder transceiver independently of arbitration addresses chosen by any other responder transceiver.

13. A system according to claim 9, wherein:

the Generate command messages transmitted by the commander transceiver specify for response a set of addresses; and the first logic circuit of each responder transceiver further comprises an address comparison logic circuit for determining whether the Generate message detected by said first logic circuit specifies for response a set of addresses which includes the arbitration address stored in the memory of that responder transceiver and, if not, then preventing the second logic circuit of the responder transceiver from choosing a new value for the arbitration address in response to said detected Generate message.

14. An RF communications system, comprising:

a commander transceiver including a transmitter circuit for transmitting Generate command messages and Identify command messages, and a receiver circuit for receiving ID messages; and a plurality of responder transceivers, wherein each responder transceiver includes a first memory for storing an arbitration address having a first number of bits, a second memory for storing a unique address having a second number of bits, the second number being greater than the first number, a transmitter circuit for transmitting ID messages, a receiver circuit for receiving command message signals, a first logic circuit for detecting whether a signal received by the receiver circuit is a Generate command message and, if so, for randomly choosing a new value for the arbitration address and storing the newly chosen arbitration address in the first memory, and a second logic circuit for detecting whether a signal received by the receiver circuit is an Identify command message which specifies for response a group of addresses which includes the arbitration address stored in the first memory of the responder transceiver and, if so, for controlling the transmitter circuit to transmit an Arbitration ID message containing the arbitration address stored in the first memory and to transmit a Unique ID message containing the unique address stored in the second memory.

15. A system according to claim 14, wherein the first logic circuit of each responder transceiver chooses the arbitration address of that responder transceiver independently of the arbitration addresses chosen by the other responder transceivers.

16. A system according to claim 14, wherein each responder transceiver further comprises:

a third logic circuit for detecting whether the Generate command message detected by the first logic circuit of the responder transceiver specifies for response a group of addresses which includes the arbitration address stored in the first memory of the responder transceiver and, if not, then preventing the first logic circuit of the responder transceiver from choosing a new value for the arbitration address in response to said detected Generate message.

17. A responder transceiver for responding to interrogation messages from a number of commander transceivers, comprising:

a first memory for storing an address which identifies the responder;

a second memory for storing a binary waiting flag having an on state and an off state;

a receiver circuit for receiving interrogation messages;

a transmitter circuit for transmitting response messages;

a first logic circuit for detecting when the receiver circuit receives an interrogation message; and a second logic circuit, responsive to an interrogation message being detected by the first logic circuit, for determining whether said interrogation message specifies for response a set of addresses which includes the address stored in the first memory and if the determination is negative, then setting the waiting flag in the second memory to the on state during a period of time, and then setting the waiting flag to the off state after said period, otherwise, if the determination is affirmative, and if the waiting flag is off, then controlling the transmitter circuit to transmit a response message.

18. A responder transceiver according to claim 17, wherein said period of time following one interrogation message being detected is great enough that any response message transmitted by the responder transceiver after the waiting period will not collide with any response message transmitted by any other responder transceiver in response to said one interrogation message.

19. A responder transceiver comprising:

a memory for storing an arbitration address which identifies the responder;

a receiver circuit for receiving command message signals;

a first logic circuit for detecting whether a signal received by the receiver circuit is a Generate command message; and a second logic circuit, responsive to a Generate message being detected by the first logic circuit, for randomly choosing a new value for the arbitration address and storing the newly chosen address in the memory.

20. A responder transceiver according to claim 19, further comprising:

a transmitter circuit for transmitting a message containing the arbitration address stored in the memory.

21. A responder transceiver according to claim 19, wherein the second logic circuit chooses the arbitration address of the responder transceiver independently of arbitration addresses chosen by any other responder transceiver.

22. A responder transceiver according to claim 19, wherein the first logic circuit further comprises:

an address comparison logic circuit for determining whether the detected Generate message specifies for response a set of addresses which includes the arbitration address stored in the memory and, if not, then preventing the second logic circuit from choosing a new value for the arbitration address in response to the detected Generate message.

23. A responder transceiver comprising:

a first memory for storing an arbitration address having a first number of bits;

a second memory for storing a unique address having a second number of bits, the second number being greater than the first number;

a transmitter circuit for transmitting messages;

a receiver circuit for receiving command message signals;

a first logic circuit for detecting whether a signal received by the receiver circuit is a Generate command message and, if so, for randomly choosing a new value for the arbitration address and storing the newly chosen arbitration address in the first memory; and a second logic circuit for detecting whether a signal received by the receiver circuit is an Identify command message which specifies for response a group of addresses which includes the arbitration address stored in the first memory of the responder transceiver and, if so, for controlling the transmitter circuit to transmit an Arbitration ID message containing the arbitration address stored in the first memory and to transmit a Unique ID message containing the unique address stored in the second memory.

24. A responder transceiver according to claim 23, wherein the first logic circuit chooses the arbitration address of the responder transceiver independently of arbitration addresses chosen by any other responder transceiver.

25. A responder transceiver according to claim 23, further comprising:

a third logic circuit for detecting whether the Generate command message detected by the first logic circuit specifies for response a group of addresses which includes the arbitration address stored in the first memory of the responder transceiver and, if not, then preventing the first logic circuit from choosing a new value for the arbitration address in response to the detected Generate message.

* * * * *